(12) United States Patent
Marzban et al.

(10) Patent No.: US 12,507,080 B2
(45) Date of Patent: Dec. 23, 2025

(54) ADJUSTING BIASED DATA DISTRIBUTIONS FOR FEDERATED LEARNING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 18/091,293

(22) Filed: Dec. 29, 2022

(65) Prior Publication Data

US 2024/0224064 A1  Jul. 4, 2024

(51) Int. Cl.
*H04W 16/22* (2009.01)
*G06N 20/00* (2019.01)

(52) U.S. Cl.
CPC ............ *H04W 16/22* (2013.01); *G06N 20/00* (2019.01)

(58) Field of Classification Search
CPC ....... H04W 16/22; G06N 20/00; G06N 3/045; G06N 3/08; G06N 3/084
See application file for complete search history.

(56) References Cited

U.S. PATENT DOCUMENTS

| 12,041,534 B2 | 7/2024 | Krishnan et al. | |
|---|---|---|---|
| 2016/0037402 A1* | 2/2016 | Rosa | H04W 36/0061 370/331 |
| 2022/0101189 A1* | 3/2022 | Ben-Itzhak | G06N 20/20 |
| 2022/0207324 A1* | 6/2022 | Hamilton | G06N 3/049 |
| 2022/0240213 A1* | 7/2022 | Ly | H04W 48/18 |
| 2023/0040284 A1* | 2/2023 | Ali-Tolppa | H04L 63/126 |
| 2023/0115368 A1* | 4/2023 | Parichehrehteroujeni | H04W 12/60 706/46 |
| 2023/0177349 A1* | 6/2023 | Balakrishnan | H04L 67/10 706/25 |
| 2023/0245000 A1* | 8/2023 | Yang | G06N 3/04 706/12 |

(Continued)

OTHER PUBLICATIONS

TSG RAN Release 18—AI/ML enabled RAN and NR Air Interface (Year: 2021).*

(Continued)

*Primary Examiner* — Nizar N Sivji

(74) *Attorney, Agent, or Firm* — Kevin M. Donnelly; Seyfarth Shaw LLP

(57) ABSTRACT

A method for wireless communication at a first user equipment (UE) includes transmitting, to a network node, a first message indicating one or more distributions of a group of local data instances associated with a machine learning model at the first UE, each local data instance of the group of local data instances associated with a class of a group of classes. The method also includes receiving, associated with transmitting the first message, from the network node, a second message indicating an update to the group of local data instances, for satisfying one or more data distribution conditions. The method further includes training, associated with the update to the group of local data instances, the machine learning model.

15 Claims, 17 Drawing Sheets

(56) References Cited

U.S. PATENT DOCUMENTS

| | | | |
|---|---|---|---|
| 2023/0267352 A1* | 8/2023 | He | G06N 20/00 |
| | | | 706/12 |
| 2024/0096058 A1* | 3/2024 | Svantesson | G06V 10/26 |
| 2024/0243984 A1* | 7/2024 | Soldati | H04L 43/08 |
| 2024/0289636 A1* | 8/2024 | Lu | G06N 3/04 |
| 2024/0334317 A1 | 10/2024 | Krishnan et al. | |
| 2024/0354591 A1* | 10/2024 | Sun | G06N 3/063 |
| 2025/0132901 A1* | 4/2025 | Chen | G06F 21/6245 |
| 2025/0139510 A1* | 5/2025 | Yang | G06N 20/00 |

OTHER PUBLICATIONS

3GPP TSG-RAN WG3 Meeting #113-e R3-213468 Electronic meeting (Year: 2021).*

* cited by examiner

ADJUSTING BIASED DATA DISTRIBUTIONS FOR FEDERATED LEARNING

FIELD OF THE DISCLOSURE

The present disclosure relates generally to wireless communications, and more specifically to adjusting biased data distributions for federated learning.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IOT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (for example, neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. Applying artificial neural network processing to a wireless communication system may improve one or more features of the wireless communication system.

Machine learning may be an example of artificial neural network processing. Some machine learning approaches centralize training data on one machine, or in a data center. In contrast, federated learning is a machine learning technique that supports collaborative learning of a shared prediction model among UEs and a parameter server (for example, a network node). Specifically, federated learning is a process in which a group of UEs receives a federated learning model (for example, a global machine learning model) from the parameter server, and the group of UEs cooperate to train the federated learning model. More specifically, each UE trains the federated learning model using a local dataset, and sends, to the parameter server, updated model parameters or gradient updates. The gradient updates may be estimated from a locally performed stochastic gradient descent process. Privacy of a respective local dataset of each UE may be maintained because each UE only transmits updated model parameters or gradient updates to the parameter server. The parameter server may aggregate the updates to obtain a global update for the federated learning model. The parameter server may then transmit the updated federated learning model, or an updated global training parameter vector, to the group of UEs, and the process may repeat until a desired performance level from the federated learning model is obtained.

SUMMARY

In one aspect of the present disclosure, a method for wireless communication at a first user equipment (UE) includes transmitting, to a network node, a first message indicating one or more distributions of a group of local data instances associated with a machine learning model at the first UE. Each local data instance of the group of local data instances may be associated with a class of a group of classes. The method further includes receiving, responsive to, based on, or otherwise associated with transmitting the first message, from the network node, a second message indicating an update to the group of local data instances, for satisfying one or more data distribution conditions. The method still further includes training, responsive to, based on, or otherwise associated with the update to the group of local data instances, the machine learning model.

Another aspect of the present disclosure is directed to an apparatus including means for transmitting, to a network node, a first message indicating one or more distributions of a group of local data instances associated with a machine learning model at the first UE. Each local data instance of the group of local data instances may be associated with a class of a group of classes. The apparatus further includes means for receiving, responsive to, based on, or otherwise associated with transmitting the first message, from the network node, a second message indicating an update to the group of local data instances, for satisfying one or more data distribution conditions. The apparatus still further includes means for training, responsive to, based on, or otherwise associated with the update to the group of local data instances, the machine learning model.

In another aspect of the present disclosure, a non-transitory computer-readable medium with non-transitory program code recorded thereon is disclosed. The program code is executed by a processor and includes program code to transmit, to a network node, a first message indicating one or more distributions of a group of local data instances associated with a machine learning model at the first UE. Each local data instance of the group of local data instances may be associated with a class of a group of classes. The program code further includes program code to receive, responsive to, based on, or otherwise associated with transmitting the first message, from the network node, a second message indicating an update to the group of local data instances, for satisfying one or more data distribution conditions. The program code still further includes program code to train, responsive to, based on, or otherwise associated with the update to the group of local data instances, the machine learning model.

Another aspect of the present disclosure is directed to an apparatus for wireless communications at first UE. The apparatus includes a processor, and a memory coupled with the processor and storing instructions operable, when executed by the processor, to cause the apparatus to transmit, to a network node, a first message indicating one or more distributions of a group of local data instances associated with a machine learning model at the first UE. Each local data instance of the group of local data instances may be associated with a class of a group of classes. Execution of the instructions further cause the apparatus to receive, responsive to, based on, or otherwise associated with transmitting the first message, from the network node, a second message indicating an update to the group of local data instances, for satisfying one or more data distribution conditions. Execution of the instructions also cause the apparatus to train, responsive to, based on, or otherwise associated with the update to the group of local data instances, the machine learning model.

In one aspect of the present disclosure, a method for wireless communication at a first UE includes transmitting, to a network node, a first message indicating a distribution of a group of local data instances associated with a local dataset associated with a machine learning model at the first UE. The method further includes receiving, responsive to, based on, or otherwise associated with transmitting the first message, a second message from the network node that configures the first UE to transmit one or more local data instances of the group of local data instances to a wireless communication device, the one or more local data instances satisfying one or more data distribution conditions. The method still further includes transmitting, responsive to, based on, or otherwise associated with receiving the second message, a third message, to the wireless communication device, that includes the one or more local data instances.

Another aspect of the present disclosure is directed to an apparatus including means for transmitting, to a network node, a first message indicating a distribution of a group of local data instances associated with a local dataset associated with a machine learning model at the first UE. The apparatus further includes means for receiving, responsive to, based on, or otherwise associated with transmitting the first message, a second message from the network node that configures the first UE to transmit one or more local data instances of the group of local data instances to a wireless communication device, the one or more local data instances satisfying one or more data distribution conditions. The apparatus still further includes means for transmitting, responsive to, based on, or otherwise associated with receiving the second message, a third message, to the wireless communication device, that includes the one or more local data instances.

In another aspect of the present disclosure, a non-transitory computer-readable medium with non-transitory program code recorded thereon is disclosed. The program code is executed by a processor and includes program code to transmit, to a network node, a first message indicating a distribution of a group of local data instances associated with a local dataset associated with a machine learning model at the first UE. The program code further includes program code to receive, responsive to, based on, or otherwise associated with transmitting the first message, a second message from the network node that configures the first UE to transmit one or more local data instances of the group of local data instances to a wireless communication device, the one or more local data instances satisfying one or more data distribution conditions. The program code still further includes program code to transmit, responsive to, based on, or otherwise associated with receiving the second message, a third message, to the wireless communication device, that includes the one or more local data instances.

Another aspect of the present disclosure is directed to an apparatus for wireless communications at first UE. The apparatus includes a processor, and a memory coupled with the processor and storing instructions operable, when executed by the processor, to cause the apparatus to transmit, to a network node, a first message indicating a distribution of a group of local data instances associated with a local dataset associated with a machine learning model at the first UE. Execution of the instructions further cause the apparatus to receive, responsive to, based on, or otherwise associated with transmitting the first message, a second message from the network node that configures the first UE to transmit one or more local data instances of the group of local data instances to a wireless communication device, the one or more local data instances satisfying one or more data distribution conditions. Execution of the instructions also cause the apparatus to transmit, responsive to, based on, or otherwise associated with receiving the second message, a third message, to the wireless communication device, that includes the one or more local data instances.

In one aspect of the present disclosure, a method for wireless communication at network node includes receiving, from a first UE, a first message indicating one or more distributions of a group of local data instances associated with a local dataset associated with a machine learning model at the first UE. Each local data instances of the group of local data instances may be associated with a respective class of a group of classes. The method further includes transmitting, responsive to, based on, or otherwise associated with receiving the first message, a second message indicating an update to the group of local data instances, for satisfying one or more data distribution conditions. The method still further includes receiving, responsive to, based on, or otherwise associated with the update to the group of local data instances, a first gradient associated with the machine learning model at the first UE.

Another aspect of the present disclosure is directed to an apparatus including means for receiving, from a first UE, a first message indicating one or more distributions of a group of local data instances associated with a local dataset associated with a machine learning model at the first UE. Each local data instances of the group of local data instances may be associated with a respective class of a group of classes. The apparatus further includes means for transmitting, responsive to, based on, or otherwise associated with receiving the first message, a second message indicating an update to the group of local data instances, for satisfying one or more data distribution conditions. The apparatus still further includes means for receiving, responsive to, based on, or otherwise associated with the update to the group of local data instances, a first gradient associated with the machine learning model at the first UE.

In another aspect of the present disclosure, a non-transitory computer-readable medium with non-transitory program code recorded thereon is disclosed. The program code is executed by a processor and includes program code to receive, from a first UE, a first message indicating one or more distributions of a group of local data instances associated with a local dataset associated with a machine learning model at the first UE. Each local data instances of the group of local data instances may be associated with a respective class of a group of classes. The program code further includes program code to transmit, responsive to, based on, or otherwise associated with receiving the first message, a second message indicating an update to the group of local data instances, for satisfying one or more data distribution conditions. The program code still further includes program code to receive, responsive to, based on, or otherwise associated with the update to the group of local data instances, a first gradient associated with the machine learning model at the first UE.

Another aspect of the present disclosure is directed to an apparatus for wireless communications at network node. The apparatus includes a processor, and a memory coupled with the processor and storing instructions operable, when executed by the processor, to cause the apparatus to receive, from a first UE, a first message indicating one or more distributions of a group of local data instances associated with a local dataset associated with a machine learning model at the first UE. Each local data instances of the group of local data instances may be associated with a respective class of a group of classes. Execution of the instructions also cause the apparatus to transmit, responsive to, based on, or otherwise associated with receiving the first message, a second message indicating an update to the group of local data instances, for satisfying one or more data distribution conditions. Execution of the instructions further cause the apparatus to receive, responsive to, based on, or otherwise associated with the update to the group of local data instances, a first gradient associated with the machine learning model at the first UE.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
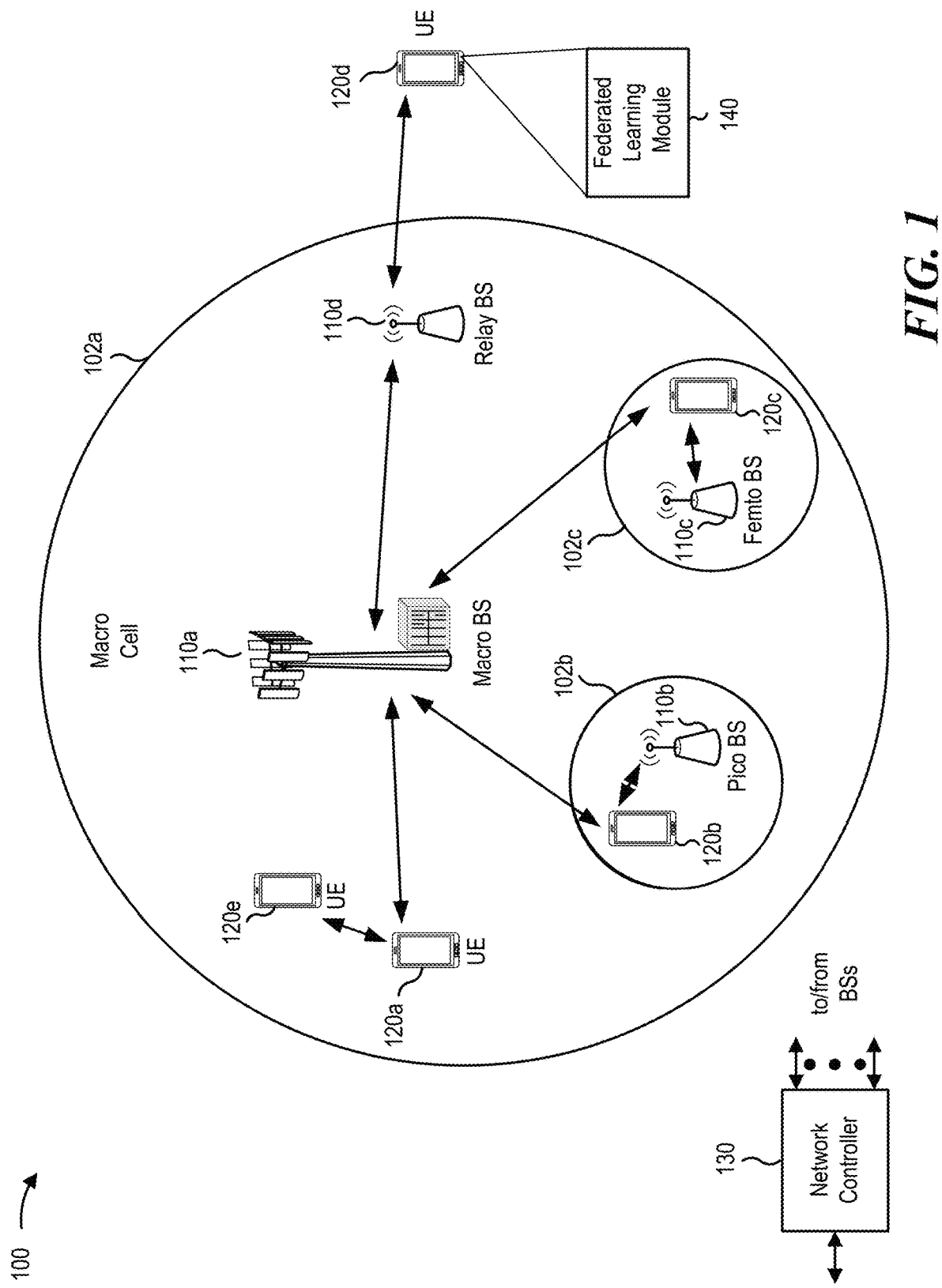
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Federated learning refers to machine learning techniques that support collaborative training, by a group user equipment (UEs), of a federated learning model. In some examples of federated learning, such a group of UEs receives and stores a local copy of a federated learning model (for example, a global machine learning model) from a parameter server (for example, a network node), and the group of UEs cooperate to train the federated learning model over the course of multiple training iterations. Each UE trains the respective locally stored version of the federated learning model using a local dataset, and sends, to the parameter server, updated model parameters or gradient updates obtained using the respective locally stored version of the federated learning model. In some specific examples, such gradient updates may be estimated from a locally performed stochastic gradient descent process. With the aforementioned techniques, privacy or secrecy of a respective local dataset of each UE may be maintained because each UE transmits only updated model parameters or gradient updates to the parameter server. The parameter server may then aggregate the reported model parameters or gradient updates to obtain a global update for the federated learning model. The parameter server may then transmit the updated federated learning model, or an updated global training parameter vector, to the group of UEs, and the process may repeat indefinitely or until a desired performance level associated with the federated learning model is obtained.

In some examples, an input data distribution and/or an output data distribution associated with a machine learning model may be biased (for example, non-independent and identically distributed (IID)). A biased distribution may also be referred to as a skewed distribution or an uneven distribution. As an example, an input data distribution may be biased in examples in which a number of instances of input data associated with one class, of a group of classes, is greater than a number of instances of respective input data associated with other classes of the group of classes. The biased input data distribution may cause a biased output data distribution.

In some examples, training a local machine learning model, at a UE, on a training dataset associated with a biased input data distribution may result in overfitting. Overfitting refers to a situation in which, after training, the local machine learning model may accurately classify data instances associated with a training dataset, but may inaccurately classify variations of the training dataset. Additionally, in some examples, an accuracy associated with classifying variations of the training data by the federated learning model may be reduced when a federated learning model is trained on gradients associated with biased data distributions, such as biased input data distributions and/or biased output data distributions. In such examples, a federated learning server (for example, a network node) may receive respective local gradients from each UE of a group of UEs and combine or aggregate the local gradients. One or more of the respective local gradients may be associated with a biased data distribution in which the one or more respective local gradients are associated with an overfitted local machine learning model. Furthermore, in such examples in which the federated learning server combines local gradients from different UEs, the federated learning model may fail to learn an accurate correspondence between respective input data associated with training each local machine learning model and respective output data generated by each local machine learning model. In such examples, training the federated learning model with the local gradients associated with biased data distributions may reduce the accuracy of classifying variations of the training data by the trained federated learning model.

Various aspects of the present disclosure are directed to adjusting a local data distribution of each of one or more UEs, of a group of UEs participating in a federated learning process, such that the local data distribution of each UE of the group of UEs matches, satisfies, or approximates (hereinafter used interchangeably) one or more data distribution conditions. Some aspects more specifically relate to examples in which each of some or all UEs, of a group of UEs participating in federated learning, receive an update to a respective group of local data instances stored by the UE for purposes of satisfying the one or more data distribution conditions. The group of local data instances at each UE are respectively associated with a respective local machine learning model stored at the UE. Additionally, each local data instance of the group of local data instances, at each UE, may be associated with a class of a group of classes. In some examples, each UE may transmit, to a network node, a respective first message indicating one or more distributions, or one or more aspects associated with the one or more distributions (hereinafter used interchangeably with the "distribution"), of the respective group of local data instances stored at the UE. In such examples, the network node may store and train the federated learning model responsive to, based on, or otherwise associated with the indicated distributions. In some examples, the one or more distributions, of each UE, include a first distribution associated with a respective set of output data instances associated with respective outputs from the machine learning model. Additionally, in some such examples, the one or more distributions, of each UE, include a second distribution associated with a respective set of input data instances associated with respective inputs to the machine learning model.

In some examples, associated with the transmission of the first message, each UE may receive, from the network node, a second message indicating a respective update to the respective group of local data instances stored at the UE for purposes of satisfying the one or more data distribution conditions. The one or more data distribution conditions may include one or more of a target data distribution, a minimum number of local data instances in each class of the group of classes, a maximum number of local data instances in each class of the group of classes, a ratio between a first number of data instances in one class, of the group of classes, associated with a greatest number of local data instances and a second number of data instances in one class, of the group of classes, associated with a least number of local data instances, a mean value associated with the group of local data instances, or a variance associated with the group of local data instances. In some examples, the respective update to the respective group of local data instances stored at a given UE indicates an adjustment to a number of local data instances in the group of local data instances. For example, the adjustment to the number of local data instances may include augmenting one or more first local data instances in the group of local data instances to increase a number of the first local data instances in the group of local data instances such that the distribution of the group of local data instances matches or better matches (used interchangeably with "matches") the target data distribution. Additionally, or alternatively, the adjustment to the number of local data instances may include removing one or more second local data instances from the group of local data instances to decrease a number of the second local data instances in the group of local data instances such that the distribution of the group of local data instances matches the target data distribution. In some other examples, the update to the group of local data instances configures a given UE to receive a third message indicating the target data distribution. In such examples, the third message may be received from the network node or another UE, such as a second UE, of the group of UE. Additionally, in such examples, each UE may augment one or more first data instances in the group of data instances and/or remove one or more second data instances from the group of data instances such that the distribution of the group of local data instances matches the target data distribution. Each UE may train its locally stored machine learning model responsive to, based on, or otherwise associated with, the update to the group of local data instances.

Some other aspects more specifically relate to configuring a UE, of a group of UEs participating in federated learning, to transmit to another wireless communication device, such as a network node or another UE of the group of UEs, some or all local data instances, of a group of local data instances associated with a local machine learning model stored at the UE, responsive to, based on or otherwise associated with one or more local data instances, of the group of local data instances, satisfying a target data distribution associated with a federated learning model. For example, the UE may transmit, to the network node, a first message indicating one or more distributions of the group of local data instances stored at the UE. In such examples, responsive to, based on or otherwise associated with the transmission of the first message, the network node may transmit, to the UE, a second message that configures the UE to transmit one or more target local data instances of the group of local data instances to the network node or other UE. Each target local data instance, of the one or more target local data instances, is an example of a local data instance, of the group of local data instances, that matches, satisfies, or approximates a target data distribution associated with the federated learning model. Responsive to, based on, or otherwise associated with the reception of the second message, the UE may transmit a third message, to the network node or other UE, that includes the one or more target local data instances.

In some examples in which the wireless communication device is the network node, associated with receiving the third message, the network node may transmit a fourth message including the one or more target local data instances to the other UE responsive to, based on, or otherwise associated with a distribution of a group of local data instances stored at the second UE failing to satisfy the target data distribution. In such examples, associated with receiving the fourth message, the other UE may augment one or more first local data instances, of the group of local data instances, and/or remove one or more second local data instances, of the group of local data instances, such that the group of local data instances stored at the other UE matches the target data distribution. The one or more first local data instances and/or the one or more second local data instances may be associated with the one or more target local data instances.

In some other examples in which the wireless communication device is the other UE, associated with receiving the third message, the other UE may augment one or more first local data instances, of a group of local data instances stored at the other UE, and/or remove one or more second local data instances, of the group of local data instances, such that the group of local data instances stored at the other UE matches the target data distribution. The one or more first local data instances and/or the one or more second local data instances may be associated with the one or more target local data instances.

Particular aspects of the subject matter described in this disclosure can be implemented to realize one or more of the following potential advantages. In some examples, by receiving a message indicating an update to a group of local data instances at a UE, of a group of UEs participating in federated learning, the UE may adjust a distribution of the group of local data instances to satisfy one or more data distribution conditions. By satisfying the one or more data distribution conditions, the UE may transmit, to a network node associated with the federated learning model, a local gradient associated with an unbiased data distribution. Training the federated learning model with local gradients associated with unbiased data distributions may increase an accuracy of the trained federated learning model.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B, an access point, a transmit and receive point (TRP), a network node, a network entity, and/or the like. A BS can be implemented as an aggregated base station, as a disaggregated base station, an integrated access and backhaul (IAB) node, a relay node, a sidelink node, etc. The BS can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs may also communicate with one another, for example, directly or indirectly via a wireless or wireline backhaul.

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IOT) devices, and/or may be implemented as NB-IOT (narrow band internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

The UEs 120 may include a federated learning module 140. For brevity, only one UE 120d is shown as including the federated learning module 140. The federated learning module 140 may perform operations, including operations of the processes 1100 and 1200 described below with reference to FIGS. 11 and 12, respectively.

Figure 2:
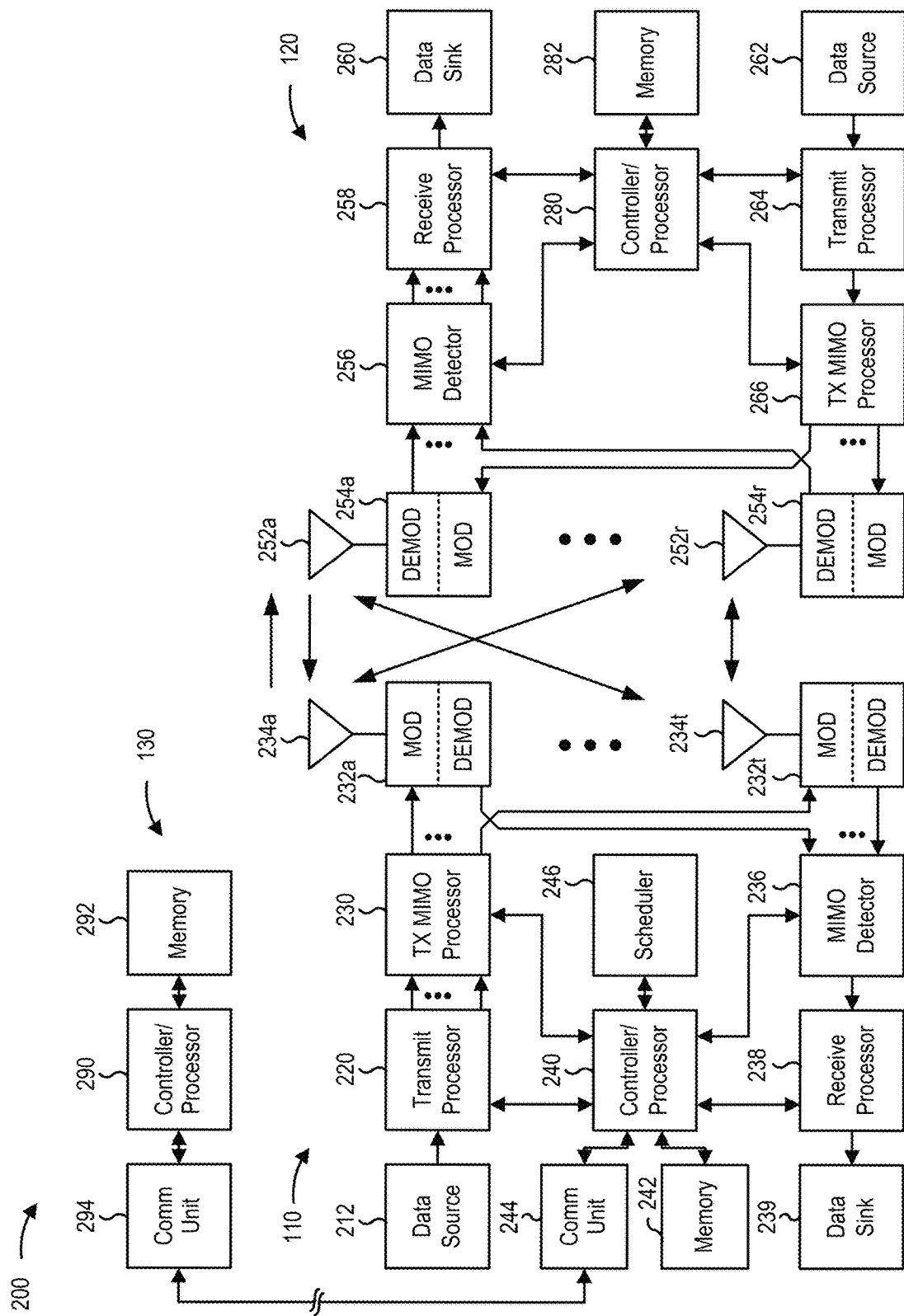
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below; the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with updating a data distribution associated with a machine learning model as described in more detail elsewhere. For example, the controller/processor 240 of the base station 110, the controller/processor 280 of the UE 120, and/or any other component(s) of FIG. 2 may perform or direct operations of, for example, the processes of FIGS. 9-10 and/or other processes as described. Memories 242 and 282 may store data and program codes for the base station 110 and UE 120, respectively. A scheduler 246 may schedule UEs for data transmission on the downlink and/or uplink.

In some cases, different types of devices supporting different types of applications and/or services may coexist in a cell. Examples of different types of devices include UE handsets, customer premises equipment (CPEs), vehicles, Internet of Things (IOT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
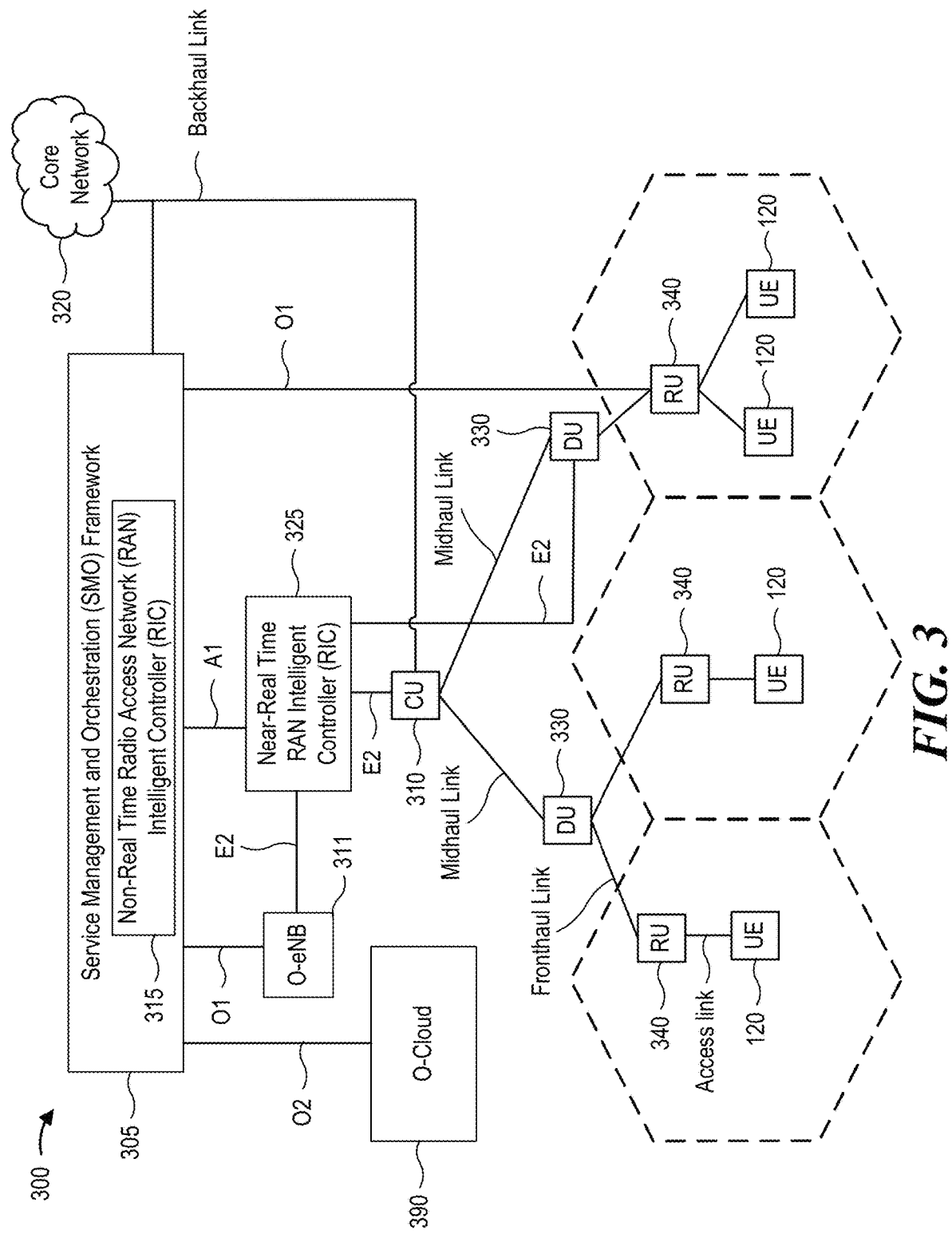
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) X11, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
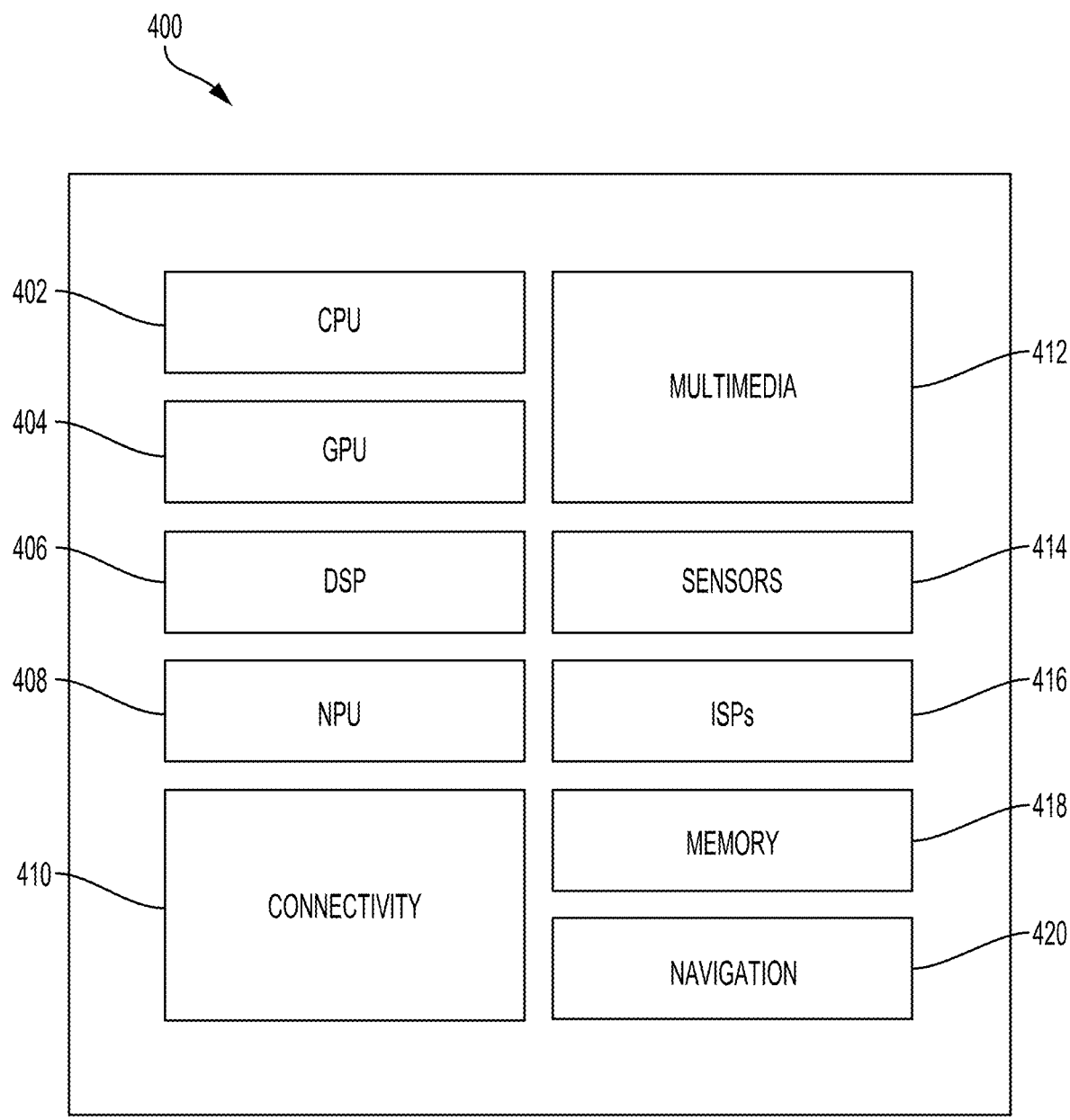
FIG. 4 illustrates an example implementation of designing a neural network using a system-on-a-chip (SOC), including a general-purpose processor, in accordance with certain aspects of the present disclosure.

FIG. 4 illustrates an example implementation of a system-on-a-chip (SOC) 400, which may include a central processing unit (CPU) 402 or a multi-core CPU configured for generating gradients for neural network training, in accordance with certain aspects of the present disclosure. The SOC 400 may be included in the base station 110 or UE 120. Variables (for example, neural signals and synaptic weights), system parameters associated with a computational device (for example, neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a memory block 418, or may be distributed across multiple blocks. Instructions executed at the CPU 402 may be loaded from a program memory associated with the CPU 402 or may be loaded from a memory block 418.

The SOC 400 may also include additional processing blocks tailored to specific functions, such as a GPU 404, a DSP 406, a connectivity block 410, which may include fifth generation (5G) connectivity, fourth generation long term evolution (4G LTE) connectivity, Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation module 420, which may include a global positioning system.

The SOC 400 may be based on an ARM instruction set. In an aspect of the present disclosure, the instructions loaded into the general-purpose processor 402 may comprise code to perform operations, including operations of the processes 1100 and 1200 described below with reference to FIGS. 11 and 12, respectively.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5A:
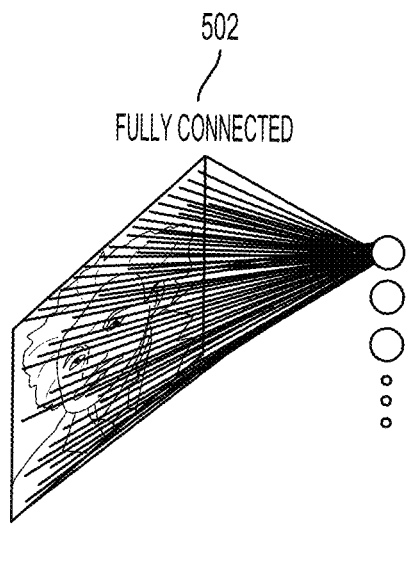
FIGS. 5A, 5B, and 5C are diagrams illustrating a neural network, in accordance with aspects of the present disclosure.
Figure 5B:
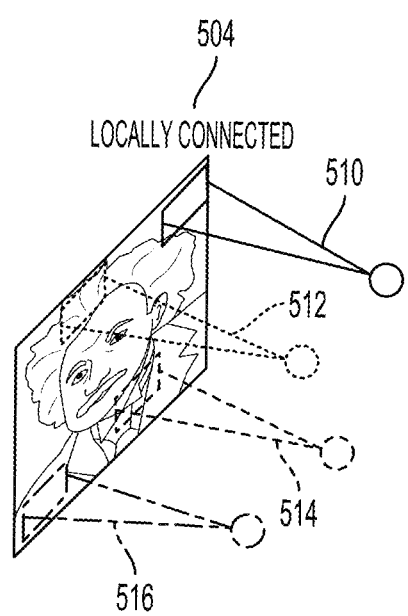

The connections between layers of a neural network may be fully connected or locally connected. FIG. 5A illustrates an example of a fully connected neural network 502. In a fully connected neural network 502, a neuron in a first layer may communicate its output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (for example, 510, 512, 514, and 516). The locally connected connectivity pattern may give rise to spatially distinct receptive fields in a higher layer because the higher layer neurons in a given region may receive inputs that are tuned through training to the properties of a restricted portion of the total input to the network.

Figure 5C:
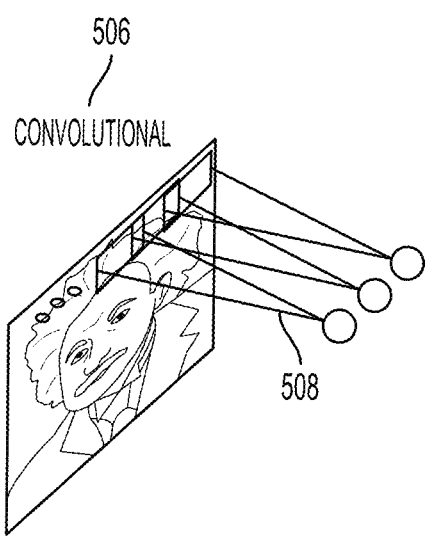

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (for example, 508). Convolutional neural networks may be well suited to problems in which the spatial location of inputs is meaningful.

Figure 5D:
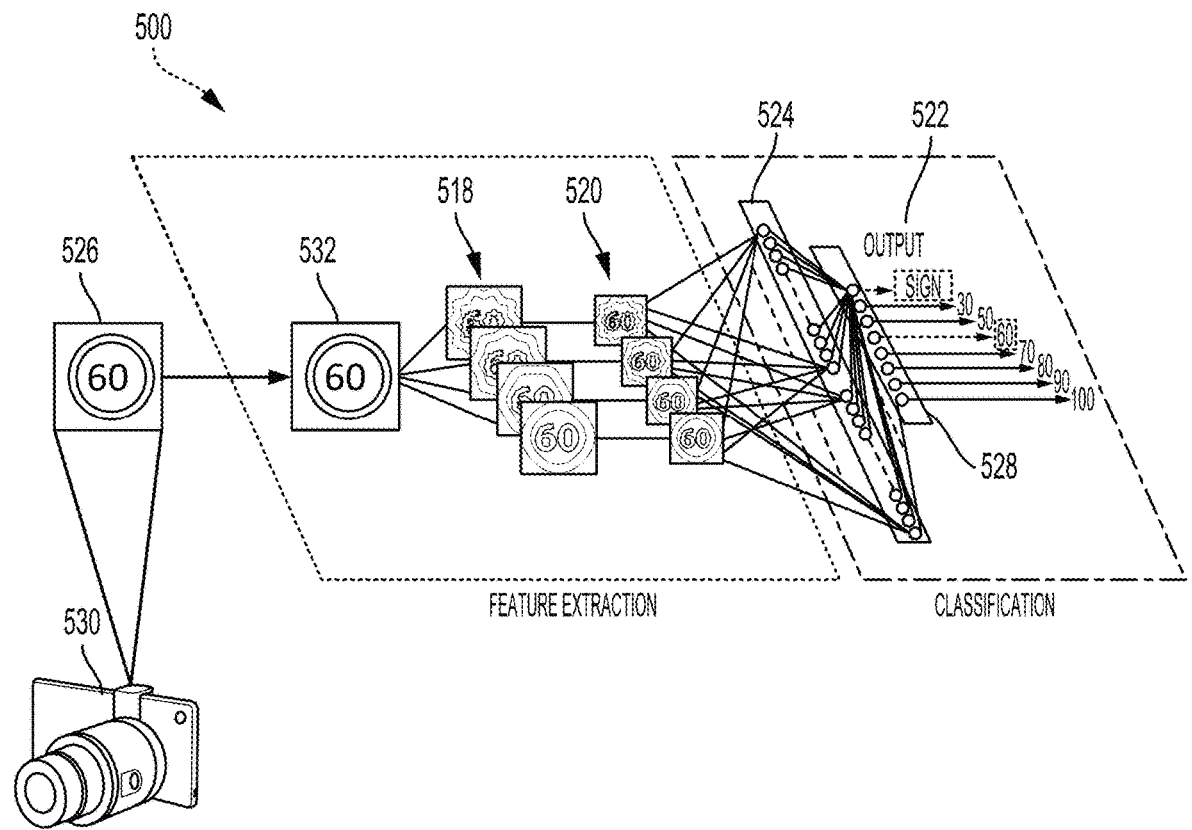
FIG. 5D is a diagram illustrating an exemplary deep convolutional network (DCN), in accordance with aspects of the present disclosure.

One type of convolutional neural network is a deep convolutional network (DCN). FIG. 5D illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5D, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 may be a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 may likely be incorrect. Thus, an error may be calculated between the output 522 and a target output. The target output is the ground truth of the image 526 (for example, "sign" and "60"). The weights of the DCN 500 may then be adjusted so the output 522 of the DCN 500 is more closely aligned with the target output.

To adjust the weights, a learning process may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 500 may be presented with new images (for example, the speed limit sign of the image 526) and a forward pass through the DCN 500 may yield an output 522 that may be considered an inference or a prediction of the DCN 500.

Deep belief networks (DBNs) are probabilistic models comprising multiple layers of hidden nodes. DBNs may be used to extract a hierarchical representation of training datasets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (for example, 220) receiving input from a range of neurons in the previous layer (for example, feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
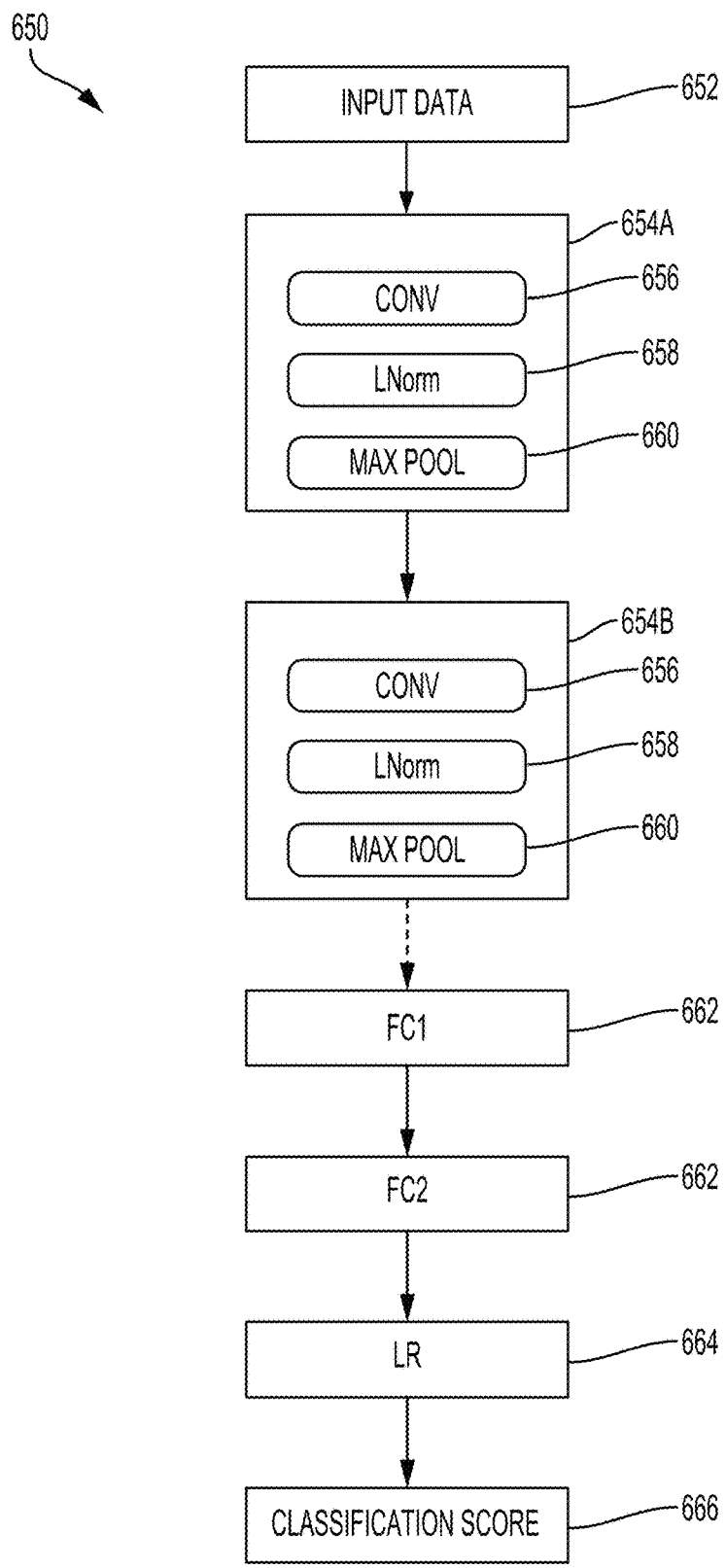
FIG. 6 is a block diagram illustrating an exemplary deep convolutional network (DCN), in accordance with aspects of the present disclosure.

FIG. 6 is a block diagram illustrating a deep convolutional network (DCN) 650. The DCN 650 may include multiple different types of layers based on connectivity and weight sharing. As shown in FIG. 6, the DCN 650 includes the convolution blocks 654A, 654B. Each of the convolution blocks 654A, 654B may be configured with a convolution layer (CONV) 656, a normalization layer (LNorm) 658, and a max pooling layer (MAX POOL) 660. Although only two of the convolution blocks 654A, 654B are shown, the present disclosure is not so limiting, and instead, any number of the convolution blocks 654A, 654B may be included in the DCN 650 according to design preference.

The convolution layers 656 may include one or more convolutional filters, which may be applied to the input data to generate a feature map. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 402 or GPU 404 of an SOC 400 (for example, FIG. 4) to achieve high performance and low power consumption. In alternative embodiments, the parallel filter banks may be loaded on the DSP 406 or an ISP 416 of an SOC 400. In addition, the DCN 650 may access other processing blocks that may be present on the SOC 400, such as sensor processor 414 and navigation module 420, dedicated, respectively, to sensors and navigation.

The DCN 650 may also include one or more fully connected layers 662 (FC1 and FC2). The DCN 650 may further include a logistic regression (LR) layer 664. Between each layer 656, 658, 660, 662, 664 of the DCN 650 are weights (not shown) that are to be updated. The output of each of the layers (for example, 656, 658, 660, 662, 664) may serve as an input of a succeeding one of the layers (for example, 656, 658, 660, 662, 664) in the DCN 650 to learn hierarchical feature representations from input data 652 (for example, images, audio, video, sensor data and/or other input data) supplied at the first of the convolution blocks 654A. The output of the DCN 650 is a classification score 666 for the input data 652. The classification score 666 may be a set of probabilities, where each probability is the probability of the input data, including a feature from a set of features.

Figure 7:
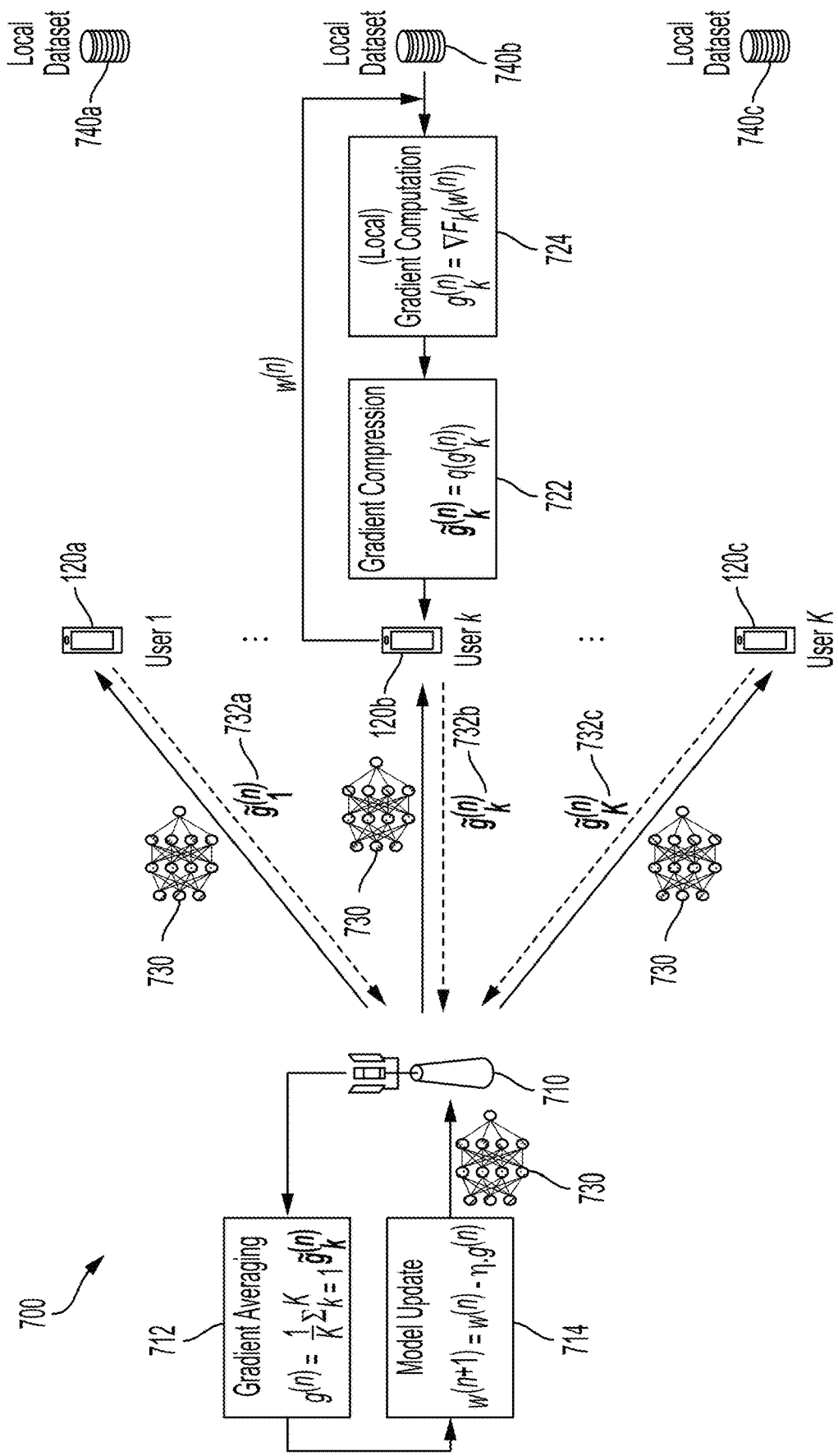
FIG. 7 is a block diagram illustrating a federated learning system, in accordance with various aspects of the present disclosure.

FIG. 7 is a block diagram illustrating a federated learning system 700, in accordance with various aspects of the present disclosure. In some configurations, a network node 710 (for example, parameter server) shares a global federated learning model 730 with a group of user equipment (UEs) 120 (for example, 120a, 120b, 120c) participating in the federated learning process. In these configurations, the model parameters are optimized by the federated learning system 700. The network node 710 may be an example of a base station 110 as described with reference to FIGS. 1 and 2, or a CU 310, DU 330, or RU 340 as described with reference to FIG. 3. Additionally, the network node 710 may perform functions associated with a federated learning server. Additionally, or alternatively, the network node 710 may include a federated learning server. The model parameters $w^{(n)}$ represent biases and weights of the global federated learning model 730, $g^{(n)}$ represents the gradient estimates, where n is a federated learning round index. The initial model parameters are designated as $w^{(0)}$.

In these configurations, the UEs 120 each include a local dataset 740 (for example, 740a, 740b, 740c), a gradient computation block 724, and a gradient compression block 722. In this example, the gradient computation block 724 of a second UE 120b is configured to perform a local update through decentralized stochastic gradient descent (SGD). Each of the UEs 120 performs some type of training iteration, such as a single stochastic gradient descent step or multiple stochastic gradient descent steps as seen in equation (1):

$$g_k^{(n)} = \nabla F_k(w^{(n)}), \quad (1)$$

where $F_k(w^{(n)})$ represents a local loss function for a weight w for the $n^{th}$ federated learning round, and $g_k^{(n)}$ represents a local gradient, for the $n^{th}$ federated learning round.

After the UEs 120 have completed the local updates $g_k^{(n)}$, the gradient compression block 722 may compress the computed gradient vector $g_k^{(n)}$ seen in equation (2), to obtain the compressed values $\tilde{g}_k^{(n)}$, (for example, 732a, 732b, 732c), where q( ) represents a compression function:

$$\tilde{g}_k^{(n)} = q(g_k^{(n)}). \qquad (2)$$

The UEs 120 feedback the computed compressed gradient vectors $\tilde{g}_k^{(n)}$, (for example, 732a, 732b, 732c) to the network node 710. This federated learning process includes transmission of the computed compressed gradient vectors $\tilde{g}_k^{(n)}$ 732 (for example, 732a, 732b, 732c) from all the UEs 120 to the network node 710 in each round of the process.

In these configurations, the network node 710 includes a gradient averaging block 712 configured to average the computed compressed gradient vectors $\tilde{g}_k^{(n)}$732. Although averaging is shown, other types of aggregation are also contemplated. In addition, a model update block 714 is configured to update parameters of the global federated learning model 730. The updated model is then sent to all of the UEs 120. This process repeats until a global federated learning accuracy specification is met (for example, until a global federated learning process converges). An accuracy specification may refer to a desired accuracy level for local training. For example, an accuracy specification may indicate that a local training loss in each iteration of the federated learning process should drop below a threshold.

This global federated learning process is based on a local loss function $F_k(w)$ as seen in equation (3):

$$F_k(w) = \frac{1}{|D_k|} \sum_{(x_j,y_j) \in D_k} f(w, x_j, y_j), \qquad (3)$$

where $x_j$ represents an input vector to the model, $y_j$ represents an output scalar from the model, w is a weight vector of the global federated learning model, and $D_k$ represents a size of the dataset at the $k^{th}$ UE. For example, the input could be a vectorized image and the output could be the detected number (for example, single scalar).

This global federated learning process is also based on a global loss function F(w) (assuming $|D_k|=D$) as seen in equation (4):

$$F(w) = \frac{\sum_{k=1}^{K} \sum_{j \in D_k} f_j(w)}{K.D} = \frac{1}{K} \sum_{k=1}^{K} F_k(w). \qquad (4)$$

An overall goal of this federated learning process is to obtain the optimal parameters for the neural network w* that minimizes the global loss function F(w):

$$w^* = \mathrm{argmin} F(w). \qquad (5)$$

In this federated learning process, local calculations of computed compressed gradient vectors $\tilde{g}_k^{(n)}$732 (for example, for updating the global federated learning model 730) are gathered from the UEs 120, and an average is computed by the gradient averaging block 712 (or another type of aggregate estimate) as follows:

$$g^{(n)} = \frac{1}{K} \sum_{k=1}^{K} \tilde{g}_k^{(n)}. \qquad (7)$$

Based on the average gradient $g^{(n)}$, the updated model parameters are transmitted (for example, broadcast) from the network node 710 to the UEs 120. The network node 710 may be an example of a federated learning server. In addition, the model update block 714 of the network node 710 performs a model update as seen in equation (7):

$$w^{(n+1)} = w^{(n)} - \eta \cdot g^{(n)}, \qquad (7)$$

where $\eta$ represents a learning rate, which is a parameter of the global federated learning model 730.

Figure 8A:
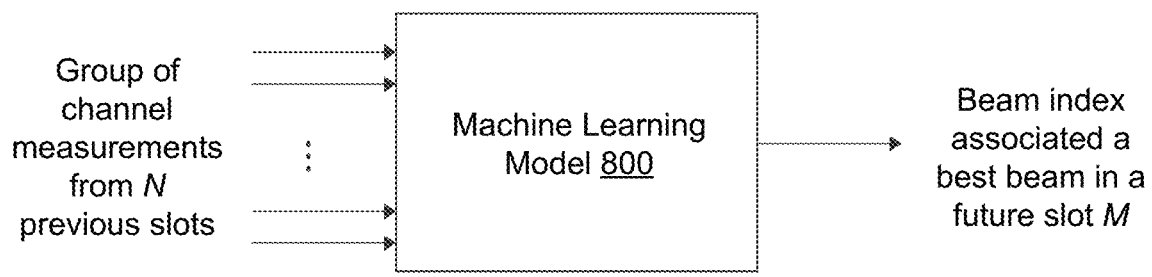
FIG. 8A is an example of a machine learning model for predicting a best beam at a future slot, in accordance with various aspects of the present disclosure.

In some examples, a federated learning model may be used for time-domain transmission beam prediction. For ease of explanation, it may be assumed that a reception beam is fixed, or a UE may select a best reception beam. FIG. 8A is an example of a machine learning model 800 for predicting a best beam at a future slot, in accordance with various aspects of the present disclosure. The machine learning model 800 may be an example of a global federated learning model 730 shared with a UE 120 as described with reference to FIG. 7, or a DCN 500 described with reference to FIG. 5. In the example of FIG. 8A, the machine learning model 800 may be a component of a UE, such as a UE 120 described with reference to FIGS. 1-3 and 7. As shown in the example of FIG. 8A, the machine learning model 800 may receive a group of channel measurements, such as RSRP measurements, from N (for example, one or more) previous slots. Each channel measurement may correspond to a downlink transmission received at the UE. Each downlink transmission may be associated with a respective beam index of a group of beam indices. The machine learning model 800 may use the channel measurement to predict a beam index associated with a best beam in a future slot M. The best beam may be a beam associated with a downlink transmission with the best channel conditions among the group of downlink transmissions received at the UE, a beam with the highest throughput among the group of downlink transmissions, and/or a beam that satisfies another communication condition. The UE may transmit parameter updates or gradients to a server to update the federated learning model. The process for transmitting parameter updates or gradients to the server may be performed by each UE responsive to, based on, or otherwise associated with respective channel measurements.

In some examples, the machine learning model 800 may minimize a loss function through gradient descent and backpropagation. The loss function may be a cross-entropy loss between a ground truth best beam and a predicted best beam. In some examples, the machine learning model 800 learns patterns associated with channel measurements that are received as input to minimize the loss function, thereby predicting the best beam. The channel measurements may be an example of a local dataset. Additionally, RSRP pattern features may be an example of the patterns associated with the channel measurements. Additionally, the patterns associated with the inputs to the machine learning model 800 may be referred to as input data features.

Figure 8B:
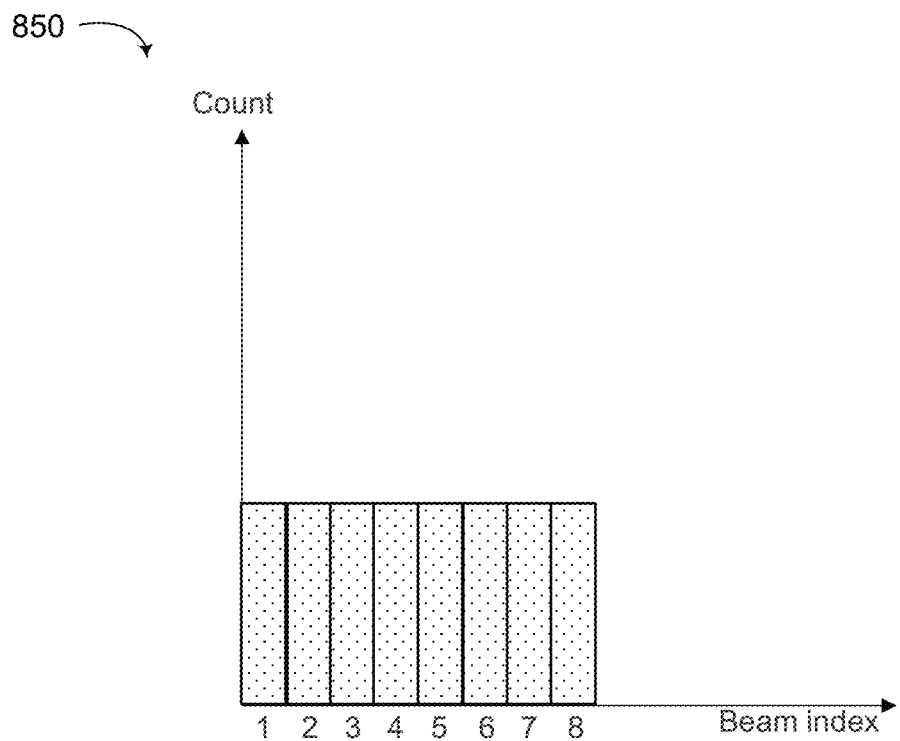
FIG. 8B is a graph illustrating an example of an output data distribution associated with a machine learning model.

FIG. 8B is a graph illustrating an example of distribution 850 of output data associated with outputs from a machine learning model. In the example of FIG. 8B, the machine learning model may be an example of the machine learning model 800 described with reference to FIG. 8A. As discussed with reference to FIG. 8A, the machine learning model may receive a group of channel measurements, such as RSRP measurements, from N (for example, one or more)

previous slots and select a best beam at a future slot M. The output data distribution 850 is an example of a distribution of an output of the machine learning model over a period of time. In the example of FIG. 8B, the y-axis represents a number of instances in which a beam index was selected as the best beam, and the x-axis represents beam indices (for example, a beam index value). In this example, it is assumed the network used eight transmission beams.

In the example of FIG. 8B, the output data distribution 850 is evenly distributed, wherein each beam index is associated with a same count as the other beam indices. Given that the output data distribution 850 of FIG. 8B is an even distribution (for example, unbiased), a pure chance best beam prediction may randomly predict any beam index as the best beam with a 12.5% accuracy (for example, ⅛ accuracy). As discussed, the machine learning model may be trained to select the best beam index, such that the accuracy of the machine learning model is greater than the pure chance best beam prediction.

Figure 8C:
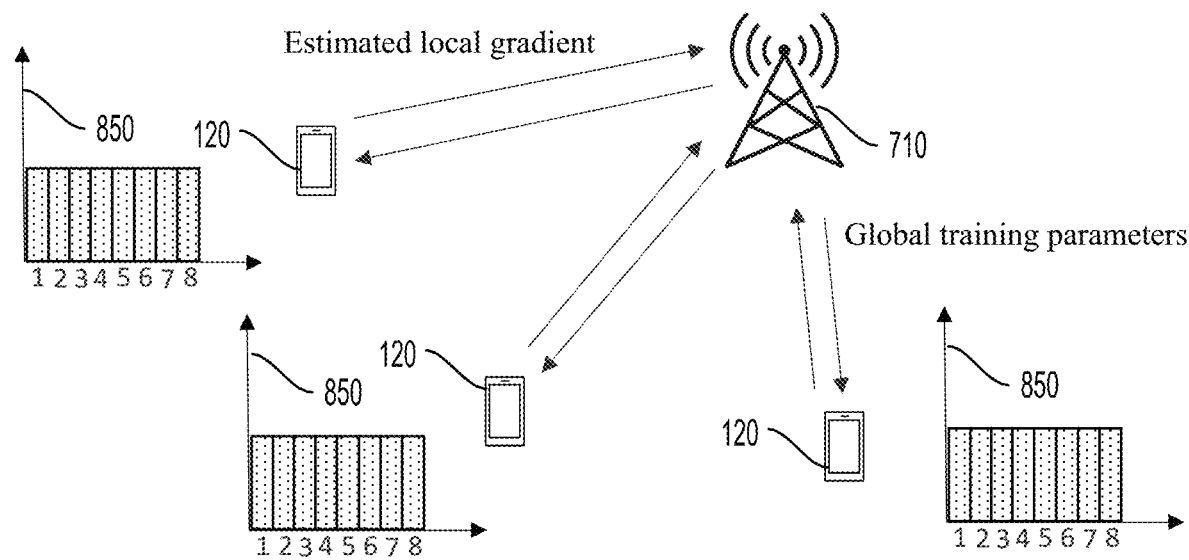
FIG. 8C is a block diagram illustrating an example of UEs sharing estimated gradients with a network node.

As discussed, in some examples, a machine learning model at each UE estimates a gradient that minimizes a loss function on a local dataset associated with the UE. A balanced output data distribution may indicate that the gradient (for example, local learned gradient) is associated with a machine learning model (for example, local machine learning model) that learned channel measurement features (for example, RSRP features) to differentiate between different beams. FIG. 8C is a block diagram illustrating an example of UEs 120 sharing estimated gradients with a network node 710. As shown in the example of FIG. 8C, the network node 710 may share global training parameters with each UE 120. As shown in the example of FIG. 8C, each UE 120 shares a respective estimated local gradient with the network node 710. In the example of FIG. 8C, each UE 120 is associated with an evenly distributed output data distribution 850. The network node 710 may calculate a global gradient by combining (for example, averaging) the local gradients from the UEs 120. The network node 710 may combine the local gradients to maximize learning of a federated learning model for different channel conditions, different environments, RF configurations, and/or operating conditions. Because a respective local machine learning model at each UE 120 is learning input features for predicting the best beam, the learning process of the federated learning model may be improved by combining the local gradients. In some examples, a global training parameter vector may be updated using the global gradient, and the global training parameter vector may be transmitted to each UE 120.

Figure 8D:
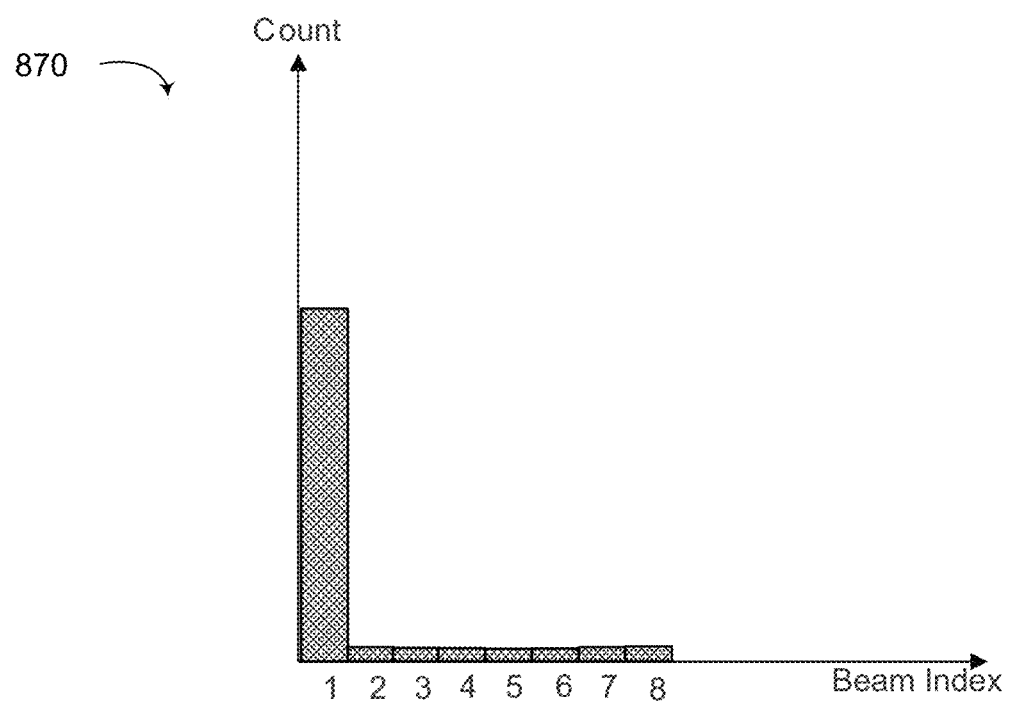
FIG. 8D is a graph illustrating an example of a biased output data distribution.

In some examples, a distribution associated with input data (for example, input data distribution) and/or a distribution associated with output data (for example, output data distribution) associated with a machine learning model may be biased (for example, skewed). FIG. 8D is a graph illustrating an example of a biased output data distribution 870. In the example of FIG. 8D, the y-axis represents a number of instances in which a beam index was selected as the best beam, and the x-axis represents the beam indices. In this example, it is assumed the network used eight transmission beams. As shown in the example of FIG. 8D, a number of counts associated with the first beam index (beam index 1) is greater than a number of counts associated with the other beam indices (beam indices 2 to 8). In such an example, in a majority of training iterations, a machine learning model predicted a beam associated with the first beam index would be the best beam (for example, the beam with a highest RSRP in a future slot). In the example of FIG. 8D, the output data distribution 870) may be biased as a result of the machine learning model receiving input data that is non-independent and identically distributed (IID). That is, the distribution of the input data (for example, local data) may be skewered Training a machine learning model on a dataset associated with a biased input data distribution and/or a biased output data distribution may result in overfitting. As discussed, a machine learning model may be trained to minimize a loss function (for example, cross-entropy loss) using gradient descent. In some examples, when a machine learning model is associated with a biased data distribution, such as the biased output data distribution 870 described with reference to FIG. 8D, when minimizing the loss function, the machine learning model, responsive to, based on, or otherwise associated with gradient descent and backpropagation, may learn to select the one beam (for example, a biased beam) regardless of a pattern associated with the channel measurements received at a machine learning model. Therefore, the machine learning model associated with the biased output data distribution 870 may fail to learn input data features associated with a future best beam.

Additionally, in some examples, an accuracy for classifying variations of training data and/or training data by the federated learning model may be reduced when the federated learning model is trained on gradients associated with biased distributions, such as biased output data distributions and/or biased input data distributions. In such examples, a federated learning server may receive local gradients from a group of UEs. Each local gradient may be associated with a biased output data distribution, such that each local gradient corresponds to an overfitted model that failed to learn input data features, such as input RSRP related features. Additionally, in some examples, the local gradients may also be associated with a biased input data distribution. Furthermore, in such examples, when the federated learning server combines local gradients from different UEs, the federated learning model may fail to learn an accurate correspondence between the input RSRPs on previous resources (for example, one or more previous slots) and the best beam on a future resource (for example, future slot). Specifically, the local gradients associated with the biased data distribution may be tuned to select a specific beam regardless of the input RSRP measurements. Therefore, gradient averaging at the federated learning server may not improve the learning process.

In some examples, local models that have the same initial training parameters may converge to different machine learning models because of variations in a local data distribution associated with each machine learning model. During the federated learning process, a divergence between a global model (for example, federated learning model) acquired by averaging local gradients associated with biased distributions and a target model acquired by averaging local gradients associated with an unbiased distribution (for example, IID) continues to increase with each training iteration, thereby slowing down the convergence and reducing an accuracy of the global model.

Various aspects of the present disclosure are directed to adjusting a local data distribution of one or more UEs participating in a federated learning process, such that the data distribution of each UE matches, satisfies or approximates (hereinafter used interchangeably) a target data distribution associated with a federated learning model. In some examples, a network node (for example, federated learning server) may configure a UE to update a distribution of a group of local data instances associated with a local dataset for training a machine learning model at the UE, wherein the UE is one UE of a group of UEs participating in federated learning. In such examples, the distribution of the group of local data instances may be updated to satisfy statistical specifications associated with a federated learning mode. In such examples, the distribution may be adjusted by adding or removing one or more data instances of the group of local data instances. In some other examples, the distribution of a group of local data instances may be adjusted to match a target distribution received from another UE.

In some examples, if the network node is training multiple federated learning models, each federated learning model may be associated with a specific target distribution. In such examples, the network node may transmit, to a UE, a message indicating an update to the group of local data instances, such that the UE adjusts the distribution of the group of local data instances to match a target data distribution that is the most similar to the current distribution of the group of local data instances.

In some implementations, prior to receiving a message indicating an update, the UE may transmit, to the network node, a message indicating a distribution of a group of local data instances associated with a local dataset for training a machine learning model at the UE. The group of local data instances may include a set of input data instances associated with inputs to the machine learning model and a set of output data instances associated with outputs from the machine learning model. Alternatively, the group of local data instances may only include the set of output data instances.

Various aspects of the present disclosure may be applied to any federated learning use case, such as, for example, interference estimation, beam selection, localization, and/or CSI estimation. In some examples, the local dataset includes information for training a federated learning model for one or more of the aforementioned use cases. In such examples, the local dataset may include channel characteristics and/or channel measurements. For example, the local dataset may include one or more of an interference power, signal to interference and noise ratio (SINR), RSRP, a received signal strength indicator (RSSI), channel state information reference signal (CSI-RS) measurements, or noise measurements.

Figure 9A:
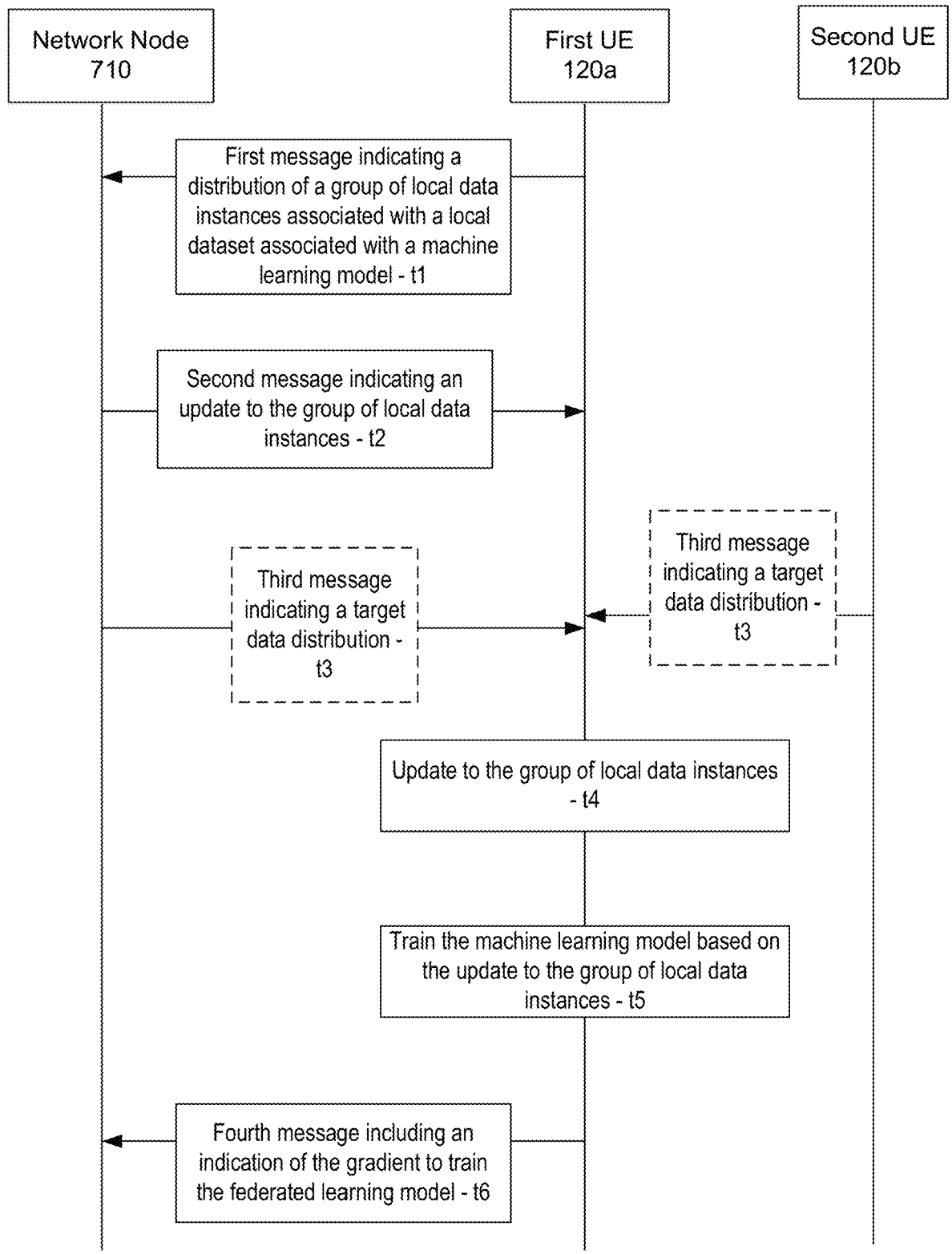
FIG. 9A is a timing diagram illustrating an example of updating a distribution of a group of local data instances at a first UE, in accordance with various aspects of the present disclosure.

FIG. 9A is a timing diagram illustrating an example 900 of updating a distribution of a group of local data instances at a first UE 120a, in accordance with various aspects of the present disclosure. In the example of FIG. 9A, the first UE 120a may be an example of one UE in a group of UEs, wherein the group of UEs include, at least, the first UE 120 and a second UE 120b. Each UE 120a and 120b may include a local machine learning model. Additionally, in accordance with a federated learning process, each UE 120a and 120b may transmit local gradients to the network node 710, such that the network node 710 may use the local gradients to update a federated learning model.

As shown in the example 900 of FIG. 9A, at time t1, the first UE 120a may transmit, to the network node 710, a first message indicating one or more distributions associated with a group of local data instances associated with a machine learning model at the first UE 120a. In some examples, the one or more distributions may include a first distribution associated with a set of output data instances associated with outputs from the machine learning model. In some examples, the outputs from the machine learning model may be predictions of a best beam of a group of beams or a best channel of a group of channels. Additionally, in some such examples, the one or more distributions may also include a second distribution associated with a set of input data instances associated with inputs to the machine learning model. In some examples, the inputs to the machine learning model may include channel characteristics, such as RSRP measurements, associated with a group of downlink transmissions received at the first UE 120a at one or more previous slots. Each downlink transmission may be associated with a transmission beam of a group of transmissions beams. After receiving the first message, the network node 710 may determine one or more distributions associated with the group of local data instances of the first UE 120a may be biased.

Additionally, at time t2, the first UE 120a receives a second message, from the network node 710, indicating an update to the group of local data instances, for satisfying one or more data distribution conditions. The one or more data distribution conditions include one or more of a target data distribution, a minimum number of local data instances in each class of the group of classes, a maximum number of local data instances in each class of the group of classes, a ratio between a first number of data instances in one class, of the group of classes, associated with a greatest number of local data instances and a second number of data instances in one class, of the group of classes, associated with a least number of local data instances, a mean value associated with the group of local data instances, or a variance associated with the group of local data instances. In some examples, the second message may be associated with the transmission of the first message. For example, the second message may be received in response to the transmission of the first message.

In some examples, the update to the group of local data instances indicates an adjustment to a number of local data instances in the group of local data instances. The first UE 120a may adjust the number of local data instances, such that the group of local data instances matches the target data distribution. The adjustment to the number of local data instances may include augmenting (for example, up-sampling) the group of local data instances by adding one or more synthetic data instances to the group of local data instances. The synthetic data instances may correspond to one or more minority classes in the group of local data instances. The synthetic data instances may be generated by one or more techniques, such as data duplication, data duplication with added random noise, and/or synthetic minority oversampling technique (SMOTE). As an example, in the beam prediction use case described with reference to FIG. 8A, after predicting the best beam indices over a period of time, some beam indices may be in a minority of best beam indices and other beam indices may be in a majority of best beam indices. The first UE 120a may augment one or more minority beam labels by duplicating data instances (for example, input RSRP measurements and a corresponding best beam label) corresponding to the minority beam labels. Alternatively, the first UE 120a may augment one or more minority beam labels by adding random noise, with controlled variance, to the input data instances, such as the RSRP measurements, associated with the minority class to generate one or more new data instances, such that the one or more new data instances are included in the local dataset. Additionally, or alternatively, the adjustment to the number of local data instances may include reducing (for example, down sampling) one or more data instances of the group of data instances. In some examples, the first UE 120a may reduce one or more data instances associated with a majority class. The first UE 120a may use one or more data reduction techniques, such as random removal of one or more data instances and/or removing data instances associated with a Tomek link. In some examples, the data instance augmentation (for example, addition) and data instance reduction (for example, removal) techniques may be configured by the network node 710. Additionally, or alternatively, the network node 710 may configure a percentage of data instances that should be augmented or reduced for each class. Additionally, or alternatively, the network node 710 may configure a range of classes and/or feature values that should be augmented or reduced.

In some other examples, the update to the group of local data instances configures the first UE 120a to receive a third message indicating a target data distribution. In some such examples, at time t3 the first UE 120a may receive the third message indicating the target data distribution from the network node 710 or the second UE 120b. According to various aspects of the present disclosure, the target data distribution may be a uniform distribution, a Gaussian distribution, or another type of distribution. In some examples, the target distribution includes one or more target data instances associated with the target data distribution. Each target data instance of the one or more target data instances may be associated with a data class of a group of data classes or an input of a group of inputs received at the second UE 120b. In some examples, features associated with the input may be within a value range. In some examples, the network node 710 may configure the second UE 120b to share a portion of the one or more target data instances with the first UE 120a via the third message. As discussed, the one or more target data instances may be associated with a specific class or may be associated with a specific statistical property, the one or more target data instances may fall within a specific range of an input data distribution and/or an output data distribution. The network node 710 may configure the first UE 120a to receive the third message and/or the second UE 120b to transmit the third message via an RRC message, a MAC-CE, or DCI. In some examples, the second UE 120b may transmit the third message via a sidelink channel, such as a physical sidelink shared channel (PSSCH) or a physical sidelink control channel (PSCCH).

In the example of FIG. 9A, at time t4, the first UE 120a may update the group of local data instances responsive to, based on, or otherwise associated with the update received in the second message or the target distribution received in the third message. In some such examples, the update may include augmenting one or more first local data instances of the group of local data instances and/or removing one or more second local data instances of the group of local data instances such that the group of local data instances matches the target data distribution. In some such examples, the first UE 120a may select a data instance augmentation and/or data instance reduction techniques to match (for example, satisfy) the one or more data distribution conditions. Aspects of the present disclosure are not limited to only adding (for example, augmenting) data instances or removing (for example, reducing) data instances. In some examples, the first UE 120a may add data instances to one or more classes while also removing data instances from one or more other classes to match the target data distribution.

As shown in FIG. 9A, after updating the group of local data instances, at time t5, the first UE 120a may train the machine learning model. The first UE 120a may estimate a gradient associated with minimizing a loss function of the machine learning model, responsive to, based on, or otherwise associated with training the machine learning model. Additionally, at time t6, the first UE 120a may transmit, to the network node 710, a third message including an indication of the gradient to train the federated learning model. The federated learning model may be stored at the network node 710.

Figure 9B:
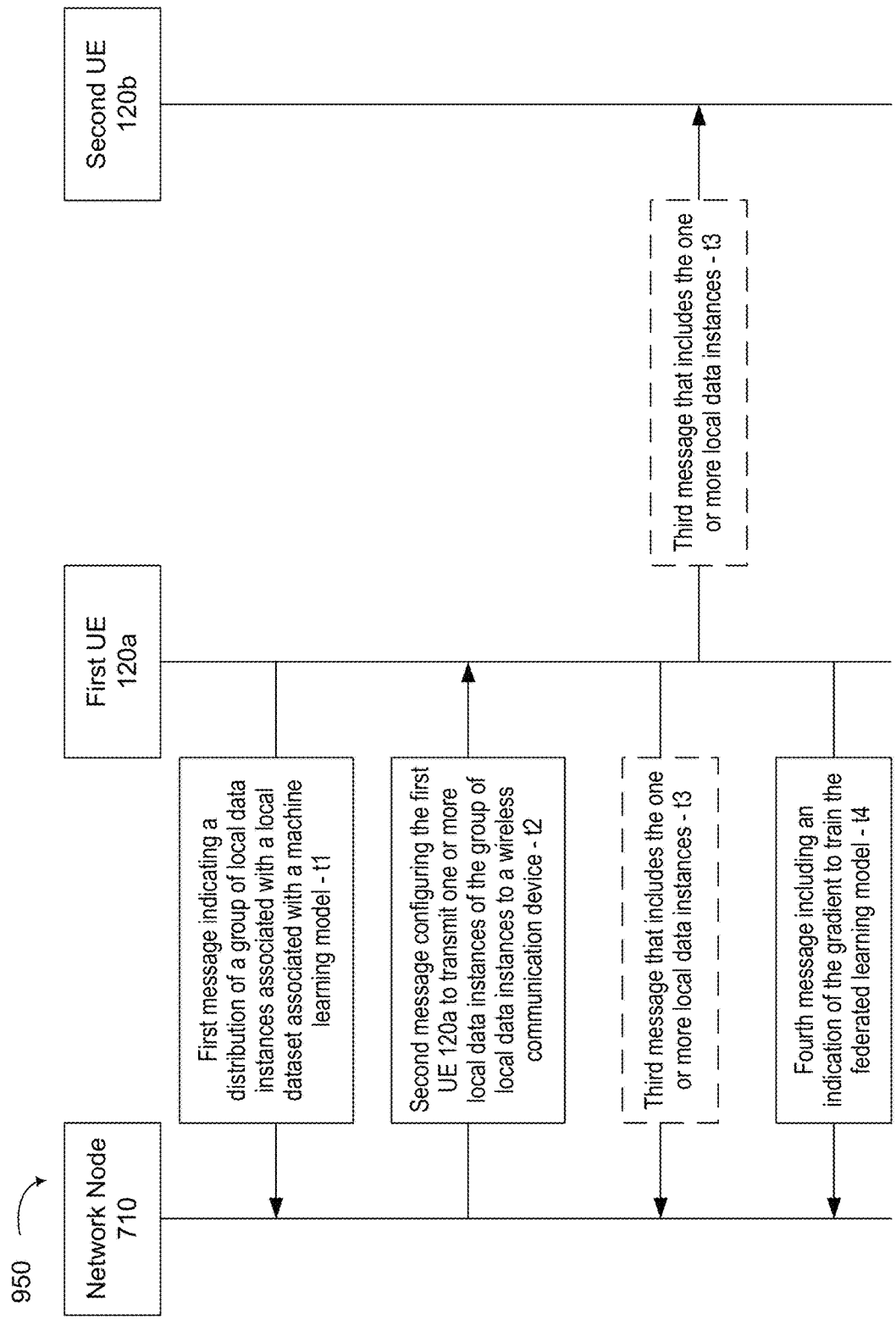
FIG. 9B is a timing diagram illustrating an example of updating a distribution of a group of local data instances at a second UE via a first UE, in accordance with various aspects of the present disclosure.

FIG. 9B is a timing diagram illustrating an example 950 of updating a distribution of a group of local data instances at a second UE 120b via a first UE 120a, in accordance with various aspects of the present disclosure. In the example of FIG. 9B, the first UE 120a may be an example of one UE in a group of UEs, wherein the group of UEs include, at least, the first UE 120a and a second UE 120b. Each UE 120a and 120b may include a local machine learning model. Additionally, in accordance with a federated learning process, each UE 120a and 120b may transmit local gradients to a network node 710, such that the network node 710 may use the local gradients to update a federated learning model.

As shown in the example 950 of FIG. 9B, at time t1, the first UE 120a may transmit, to the network node 710, a first message indicating one or more distributions of a group of local data instances associated with machine learning model at the first UE 120a. In some examples, the one or more distributions include a first distribution associated with a set of output data instances associated with outputs from the machine learning model. Additionally, in some such examples, the one or more distribution also include a second distribution associated with a respective set of input data instances associated with respective inputs to the machine learning model. After receiving the first message, the network node 710 may determine the distribution of at least one or more local data instances of the group of local data instances of the first UE 120a satisfies a target data distribution. The group of local data instances may include a set of output data instances associated with outputs from the machine learning model. Additionally, in some examples, the group of local data instances may also include a set of input data instances associated with the inputs to the machine learning model. The local dataset may include channel characteristics, such as RSRP measurements, associated with a group of downlink transmissions received at the first UE 120a at one or more previous slots. Each downlink transmission may be associated with a transmission beam of a group of transmission beams.

As shown in the example 950 of FIG. 9B, at time t2, the first UE 120a may receive a second message from the network node 710 that configures the first UE 120a to transmit one or more local data instances (for example, one or more target data instances) of the group of local data instances to a wireless communication device. The wireless communication device may be a second UE 120b or the network node 710. In some examples, the second message may be an RRC message, a MAC-CE, or DCI. The one or more local data instances may satisfy a target data distribution associated with a federated learning model. Specifically, the one or more local data instances may be associated with a specific class or may be associated with a specific statistical property. For example, the one or more local data instances may fall within a specific range of an input data distribution and/or an output data distribution. For example, input features associated with the one or more local data instances may fall within a specific value range. As an example, one of the one or more local data instances may be an RSRP measurement that falls within a value range. As another example, one of the one or more local data instances may be a beam index associated with a best beam responsive to, based on, or otherwise associated with a group of inputs (for example, a group of channel characteristics or RSRP measurements).

As shown in the example 950 of FIG. 9B, at time t3, the first UE 120a may transmit a third message, to the wireless communication device (for example, the network node 710 or the second UE 120b), that includes the one or more local data instances (for example, target data instances). The third message may be responsive to, based on, or otherwise associated with the reception of the second message. That is, the third message may be transmitted in response to receiving the second message. In some examples, the third message may be transmitted to the second UE 120b via a sidelink channel, such as a PSSCH or a PSCCH.

Additionally, in some examples, the first UE 120a may train the machine learning model at the first UE 120a on input data instances associated with the group of local data instances (not shown in FIG. 9B). In such examples, the machine learning model may estimate a gradient associated with minimizing a loss function responsive to, based on, or otherwise associated with the training. Additionally, at time t4, the first UE 120a may transmit, to the network node 710, an indication of the gradient to train the federated learning model.

Figure 10:
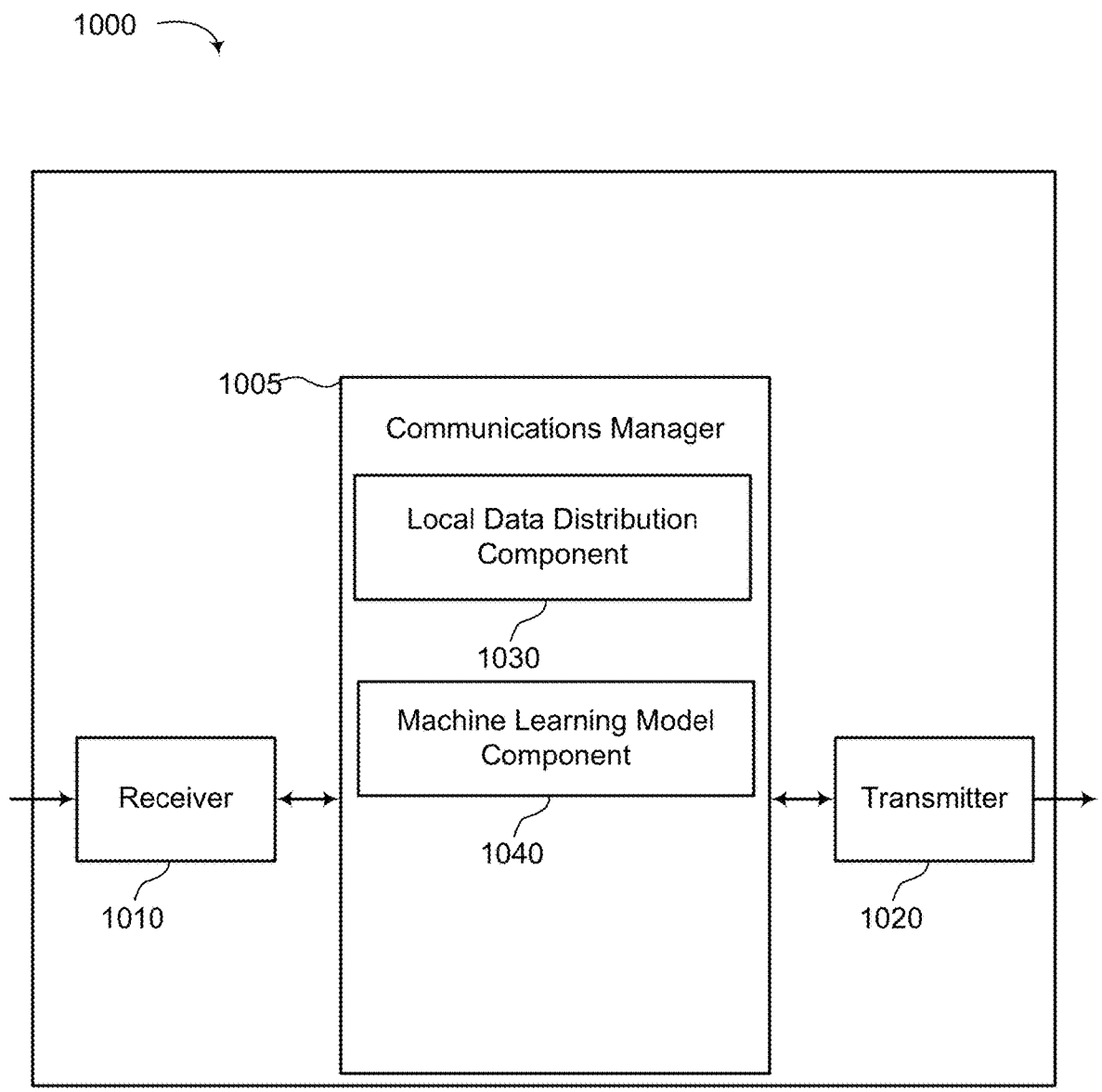
FIG. 10 is a block diagram illustrating an example wireless communication device that supports updating a local data distribution, in accordance with some aspects of the present disclosure.

FIG. 10 is a block diagram illustrating an example wireless communication device 1000 that supports updating a local data distribution, in accordance with some aspects of the present disclosure. The device 1000 may be an example of aspects of a UE 120 described with reference to FIGS. 1, 2, 3, 7, 8B, 9A, and 9B. The wireless communication device 1000 may include a receiver 1010, a communications manager 1005, a transmitter 1020, a local data distribution component 1030, and a machine learning model component 1040 which may be in communication with one another (for example, via one or more buses). In some examples, the wireless communication device 1000 is configured to perform operations, including operations of the processes 1100 and 1200 described below with reference to FIGS. 11 and 12, respectively.

In some examples, the wireless communication device 1000 can include a chip, chipset, package, or device that includes at least one processor and at least one modem (for example, a 5G modem or other cellular modem). In some examples, the communications manager 1005, or its subcomponents, may be separate and distinct components. In some examples, at least some components of the communications manager 1005 are implemented at least in part as software stored in a memory. For example, portions of one or more of the components of the communications manager 1005 can be implemented as non-transitory code executable by the processor to perform the functions or operations of the respective component.

The receiver 1010 may receive one or more reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel (PSCCH) and data channels (for example, a physical downlink shared channel (PDSCH), physical sidelink shared channel (PSSCH), a physical uplink shared channel (PUSCH)). The other wireless communication devices may include, but are not limited to, a base station 110 as described with reference to FIGS. 1 and 2, a CU 310, DU 330, or RU 340 as described with reference to FIG. 3, or a network node 710 as described with reference to FIGS. 7, 8B, 9A, and 9B.

The received information may be passed on to other components of the device 1000. The receiver 1010 may be an example of aspects of the receive processor 258 described with reference to FIG. 2. The receiver 1010 may include a set of radio frequency (RF) chains that are coupled with or otherwise utilize a set of antennas (for example, the set of antennas may be an example of aspects of the antennas 252 described with reference to FIG. 2).

The transmitter 1020 may transmit signals generated by the communications manager 1005 or other components of the wireless communication device 1000. In some examples, the transmitter 1020 may be collocated with the receiver 1010 in a transceiver. The transmitter 1020 may be an example of aspects of the transmit processor 264 described with reference to FIG. 2. The transmitter 1020 may be coupled with or otherwise utilize a set of antennas (for example, the set of antennas may be an example of aspects of the antennas 252 described with reference to FIG. 2), which may be antenna elements shared with the receiver 1010. In some examples, the transmitter 1020 is configured to transmit control information in a PUCCH, PSCCH, or PDCCH and data in a physical uplink shared channel (PUSCH), PSSCH, or PDSCH.

The communications manager 1005 may be an example of aspects of the controller/processor 280 described with reference to FIG. 2. The communications manager 1005 may include the local data distribution component 1030 and the machine learning model component 1040. In some examples, working in conjunction with the transmitter 1020, the local data distribution component 1030 may transmits, to a network node, a first message indicating one or more distributions of a group of local data instances associated with a machine learning model at the first UE. Each local data instance of the group of local data instances may be associated with a class of a group of classes. Working in conjunction with the receiver 1010 the machine learning model component 1040 receives, responsive to, based on, or otherwise associated with transmitting the first message, from the network node, a second message indicating an update to the group of local data instances, for satisfying one or more data distribution conditions. The machine learning model component 1040 may then, responsive to, based on, or otherwise associated with the update to the group of local data instances, the machine learning model.

In some other examples, working in conjunction with the transmitter 1020, the local data distribution component 1030 may, transmit to a network node, a first message indicating a distribution of a group of local data instances associated with a local dataset associated with a machine learning model at the first UE. Working in conjunction with the receiver 1010 the local data distribution component 1030 receives, responsive to, based on, or otherwise associated with transmitting the first message, a second message from the network node that configures the first UE to transmit one or more local data instances of the group of local data instances to a wireless communication device, the one or more local data instances satisfying one or more data distribution conditions. Furthermore, working in conjunction with the transmitter 1020, the local data distribution component 1030 may, responsive to, based on, or otherwise associated with receiving the second message, a third message, to the wireless communication device, that includes the one or more local data instances.

Figure 11:
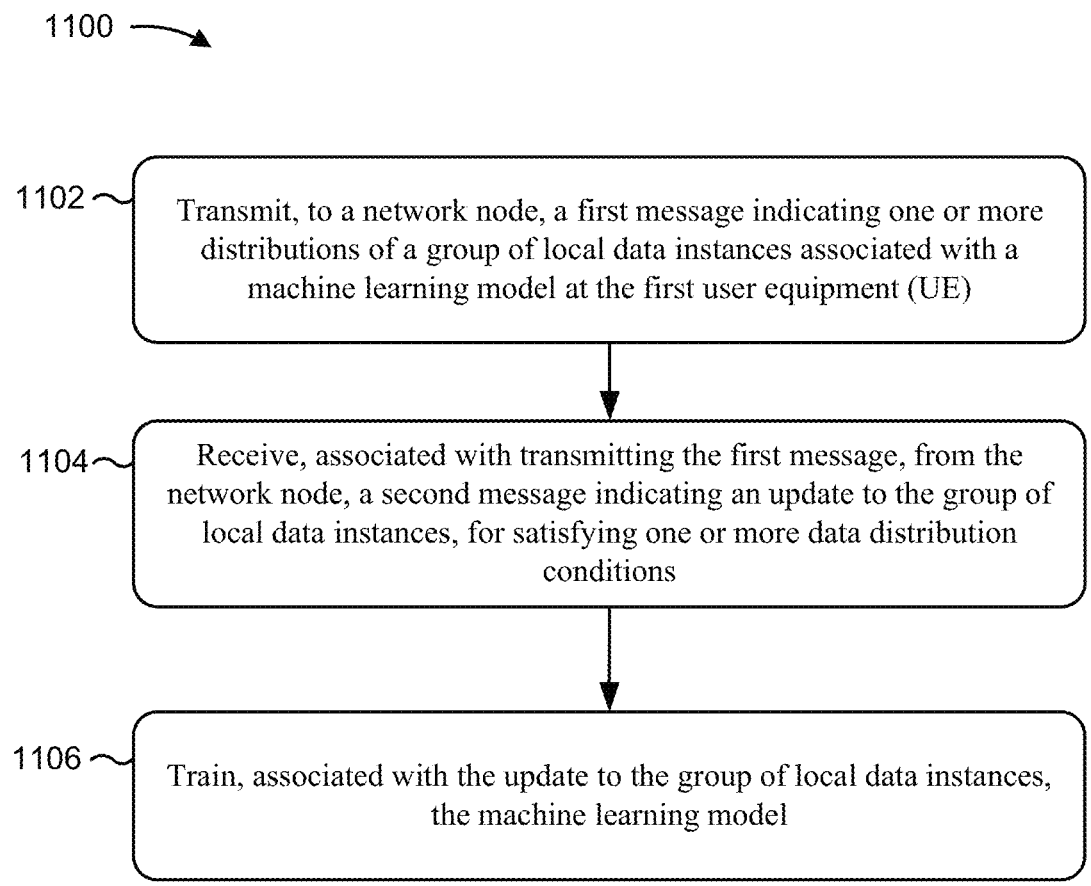
FIG. 11 is a flow diagram illustrating an example process performed by a UE that supports updating a local data distribution, in accordance with some aspects of the present disclosure.

FIG. 11 is a flow diagram illustrating an example process 1100 performed by a UE 120, in accordance with some aspects of the present disclosure. The example process 1100 is an example of a updating a local data distribution. As shown in FIG. 11, the process 1100 begins at block 1102 by transmitting, to a network node, a first message indicating one or more distributions of a group of local data instances associated with a machine learning model at the first UE, each local data instance of the group of local data instances associated with a class of a group of classes. At block 1104, the process 1100 receives, associated with transmitting the first message, from the network node, a second message indicating an update to the group of local data instances, for satisfying one or more data distribution conditions. At block 1106, the process 1100 trains, associated with the update to the group of local data instances, the machine learning model.

Figure 12:
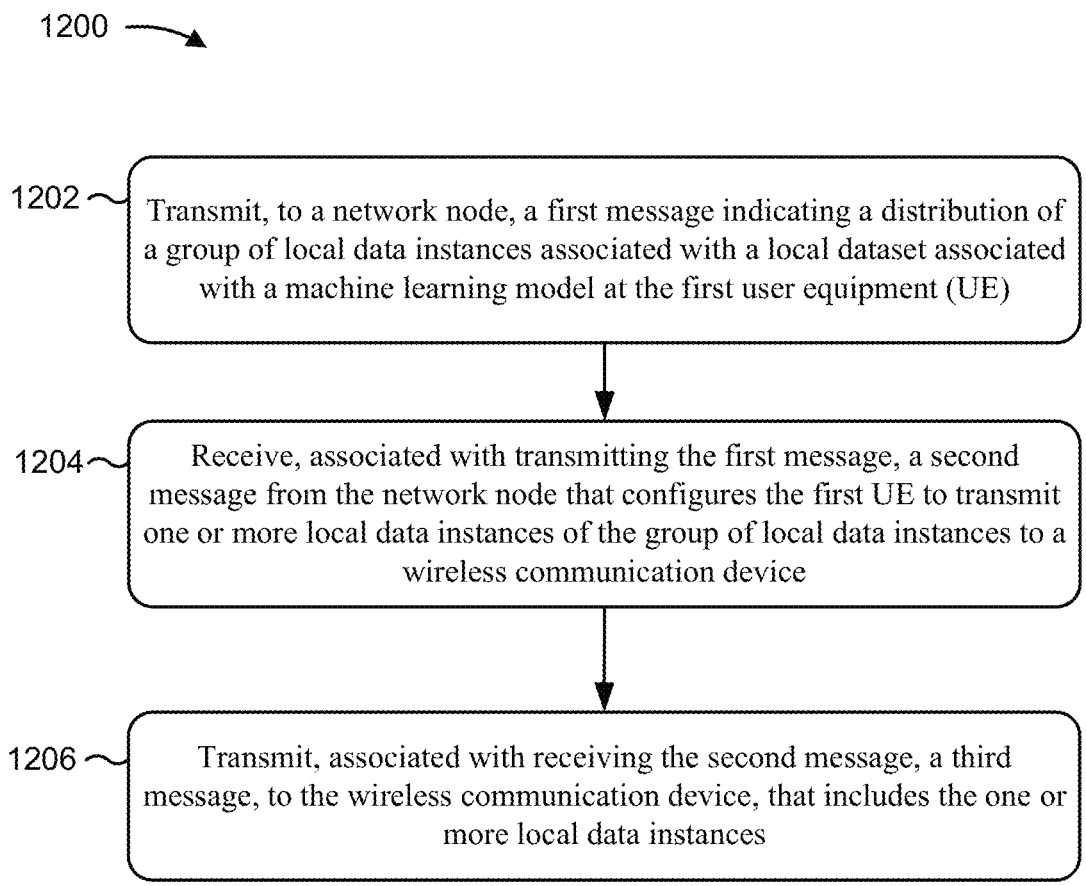
FIG. 12 is a flow diagram illustrating an example process performed by a UE that supports updating a local data distribution, in accordance with some aspects of the present disclosure.

FIG. 12 is a flow diagram illustrating an example process 1200 performed by a UE 120, in accordance with some aspects of the present disclosure. The example process 1200 is an example of a updating a local data distribution. As shown in the example of FIG. 12, the process 1200 begins at block 1202 by transmitting, to a network node, a first message indicating a distribution of a group of local data instances associated with a local dataset associated with a machine learning model at the first UE. At block 1204, the process 1200 receives, responsive to, based on, or otherwise associated with transmitting the first message, a second message from the network node that configures the first UE to transmit one or more local data instances of the group of local data instances to a wireless communication device, the one or more local data instances satisfying one or more data distribution conditions. At block 1206, the process 1200 transmits, responsive to, based on, or otherwise associated with receiving the second message, a third message, to the wireless communication device, that includes the one or more local data instances.

Figure 13:
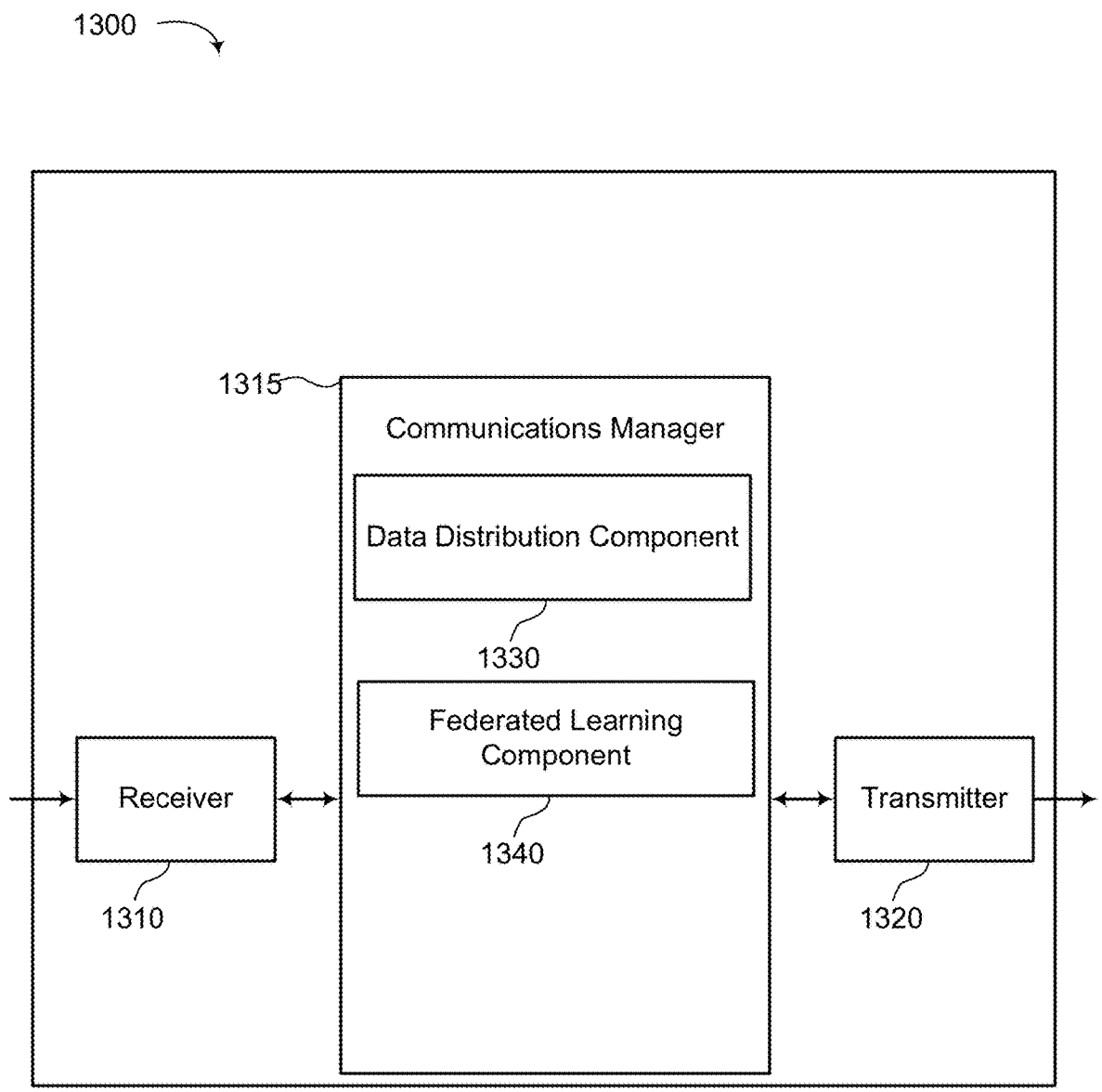
FIG. 13 is a block diagram illustrating an example wireless communication device that supports updating a local data distribution, in accordance with some aspects of the present disclosure.

FIG. 13 is a block diagram illustrating an example wireless communication device 1300 that supports receiving a group of PDUs associated with one or more PDU sets. The wireless communication device 1300 may be an example of a base station 110 as described with reference to FIGS. 1 and 2, a CU 310, DU 330, or RU 340 as described with reference to FIG. 3, or a network node 710 described with reference to FIGS. 7, 9A, and 9B. The wireless communication device 1300 may include a receiver 1310, a communications manager 1315, a data distribution component 1330, a federated learning component 1340, and a transmitter 1320, which may be in communication with one another (for example, via one or more buses). In some examples, the wireless communication device 1300 is configured to perform operations, including operations of the process 900 described below with reference to FIG. 9.

In some examples, the wireless communication device 1300 can include a chip, an SOC (for example, SOC 400 described with reference to FIG. 4), chipset, package, or device that includes at least one processor and at least one modem (for example, a 5G modem or other cellular modem). In some examples, the communications manager 1315, or its sub-components, may be separate and distinct components. In some examples, at least some components of the communications manager 1315 are implemented at least in part as software stored in a memory. For example, portions of one or more of the components of the communications manager 1315 can be implemented as non-transitory code executable by the processor to perform the functions or operations of the respective component.

The receiver 1310 may receive one or more reference signals (for example, periodically configured channel state information-reference signals (CSI-RSs), aperiodically configured CSI-RSs, or multi-beam-specific reference signals), synchronization signals (for example, synchronization signal blocks (SSBs)), control information, or data information, such as in the form of packets, from one or more other wireless communication devices via various channels including control channels (for example, a physical uplink control channel (PUCCH) or a physical sidelink control channel (PSCCH)) and data channels (for example, a physical uplink shared channel (PUSCH) or a physical sidelink shared channel (PSSCH)). The other wireless communication devices may include, but are not limited to, a UE 120, described with reference to FIG. 1, 2, 3, 7, 9A, or 9B.

The received information may be passed on to other components of the wireless communication device 1300. The receiver 1310 may be an example of aspects of the receive processor 238 described with reference to FIG. 2. The receiver 1310 may include a set of radio frequency (RF) chains that are coupled with or otherwise utilize a set of antennas (for example, the set of antennas may be an example of aspects of the antennas 234 described with reference to FIG. 2).

The transmitter 1320 may transmit signals generated by the communications manager 1315 or other components of the wireless communication device 1300. In some examples, the transmitter 1320 may be collocated with the receiver 1310 in a transceiver. The transmitter 1320 may be an example of aspects of the transmit processor 220 described with reference to FIG. 2. The transmitter 1320 may be coupled with or otherwise utilize a set of antennas (for example, the set of antennas may be an example of aspects of the antennas 234), which may be antenna elements shared with the receiver 1310. In some examples, the transmitter 1320 is configured to transmit control information in a physical downlink control channel (PDCCH) or a PSCCH and data in a physical downlink shared channel (PDSCH) or PSSCH.

The communications manager 1315 may be an example of aspects of the controller/processor 240 described with reference to FIG. 2. The communications manager 1315 includes the data distribution component 1330 and the federated learning component 1340. In some examples, working in conjunction with the receiver 1310, the data distribution component 1330 receives, from a first UE, a first message indicating one or more distributions of a group of local data instances associated with a local dataset associated with a machine learning model at the first UE. Each local data instances of the group of local data instances may be associated with a respective class of a group of classes. Working in conjunction with the transmitter 1320, the data distribution component 1330 transmits, responsive to, based on, or otherwise associated with receiving the first message, a second message indicating an update to the group of local data instances, for satisfying one or more data distribution conditions. Additionally, working in conjunction with the receiver 1310, the federated learning component 1340, receives, responsive to, based on, or otherwise associated with the update to the group of local data instances, a first gradient associated with the machine learning model at the first UE.

Figure 14:
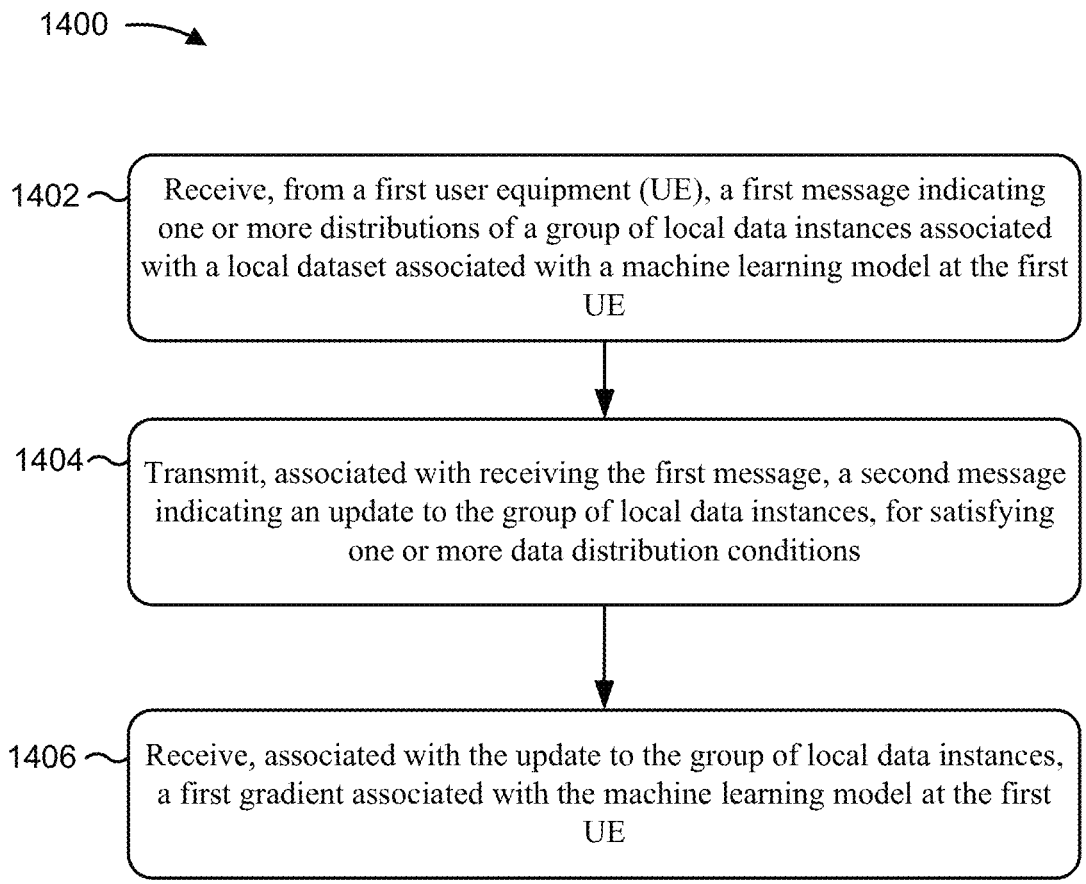
FIG. 14 is a flow diagram illustrating an example process performed by a network node that supports updating a local data distribution, in accordance with some aspects of the present disclosure.

FIG. 14 is a flow diagram illustrating an example process 1400 performed by a network node, in accordance with some aspects of the present disclosure. The example process 1400 is an example of a updating a local data distribution at a UE. As shown in FIG. 14, the process 1400 begins at block 1402 by receiving, from a first UE, a first message indicating one or more distributions of a group of local data instances associated with a local dataset associated with a machine learning model at the first UE. Each local data instances of the group of local data instances may be associated with a respective class of a group of classes. At block 1404, the process 1400 transmits, responsive to, based on, or otherwise associated with receiving the first message, a second message indicating an update to the group of local data instances, for satisfying one or more data distribution conditions. At block 1406, the process 1400 receives, responsive to, based on, or otherwise associated with the update to the group of local data instances, a first gradient associated with the machine learning model at the first UE.

Implementation examples are described in the following numbered clauses:

Clause 1. A method for wireless communication at a first UE, comprising: transmitting, to a network node, a first message indicating one or more distributions of a group of local data instances associated with a machine learning model at the first UE, each local data instance of the group of local data instances associated with a class of a group of classes: receiving, associated with transmitting the first message, from the network node, a second message indicating an update to the group of local data instances, for satisfying one or more data distribution conditions; and training, associated with the update to the group of local data instances, the machine learning model.

Clause 2. The method of Clause 1, wherein the one or more data distribution conditions include one or more of a target data distribution, a minimum number of local data instances in each class of the group of classes, a maximum number of local data instances in each class of the group of classes, a ratio between a first number of data instances in one class, of the group of classes, associated with a greatest number of local data instances and a second number of data instances in one class, of the group of classes, associated with a least number of local data instances, a mean value associated with the group of local data instances, or a variance associated with the group of local data instances.

Clause 3. The method of any one of Clauses 1-2, further comprising: augmenting one or more first local data instances of the group of local data instances such that each distribution of the one or more distributions satisfies the one or more data distribution conditions; and/or removing one or more second local data instances from the group of local data instances such that each distribution of the one or more distributions satisfies the one or more data distribution conditions.

Clause 4. The method of any one of Clauses 1-3, further comprising receiving a third message indicating the target data distribution, wherein: the second message configures the first UE to receive the third message; and the third message is received from a second UE or the network node.

Clause 5. The method of Clause 4, wherein: the target data distribution includes indications of one or more target data instances; and each target data instance of the one or more target data instances is associated with a one class of the group of classes or an input of a group of inputs received at the second UE.

Clause 6. The method of Clause 5, wherein the third message is received, from the second UE, via a PSSCH or a PSCCH.

Clause 7. The method of Clause 1, wherein the update to the group of local data instances indicates an adjustment to an amount of local data instances in the group of local data instances.

Clause 8. The method of any one of Clauses 1-7, wherein the one or more distributions include one of: a first distribution associated with a set of output data instances associated with outputs from the machine learning model and a second distribution associated with a set of input data instances associated with inputs to the machine learning model; or the first distribution associated with set of output data instances.

Clause 9. The method of any one of Clauses 1-8, further comprising: estimating a gradient associated with minimizing a loss function, associated with the machine learning model, based on training the machine learning model; and transmitting, to the network node, an indication of the gradient to train a federated learning model at the network node.

Clause 10. A method for wireless communication at a first UE, comprising: transmitting, to a network node, a first message indicating a distribution of a group of local data instances associated with a local dataset associated with a machine learning model at the first UE; receiving, associated with transmitting the first message, a second message from the network node that configures the first UE to transmit one or more local data instances of the group of local data instances to a wireless communication device, the one or more local data instances satisfying one or more data distribution conditions; and transmitting, associated with receiving the second message, a third message, to the wireless communication device, that includes the one or more local data instances.

Clause 11. The method of Clause 10, wherein the group of local data instance includes one of: a set of input data instances associated with inputs to the machine learning model and a set of output data instances associated with outputs from the machine learning model: or the set of output data instances associated with the outputs from the machine learning model.

Clause 12. The method of any one Clauses 10-11, wherein the wireless communication device is the network node or a second UE.

Clause 13. The method of any one Clauses 10-12, wherein the third message is transmitted to the second UE via a PSSCH or a PSCCH.

Clause 14. The method of any one Clauses 10-13, wherein the second message is an RRC message, a MAC-CE, or DCI.

Clause 15. The method of any one of claims 16-20, further comprising: training the machine learning model on the group of local data instances; estimating a gradient associated with minimizing a loss function, associated with the machine learning model, based on training the machine learning model; and transmitting, to the network node, an indication of the gradient to train a federated learning model at the network node.

Clause 16. A method for wireless communication at a network node, comprising: receiving, from a first UE, a first message indicating one or more distributions of a group of local data instances associated with a local dataset associated with a machine learning model at the first UE, each local data instances of the group of local data instances associated with a respective class of a group of classes: transmitting, associated with receiving the first message, a second message indicating an update to the group of local data instances, for satisfying one or more data distribution conditions: and receiving, associated with the update to the group of local data instances, a first gradient associated with the machine learning model at the first UE.

Clause 17. The method of Clause 16, wherein the one or more data distribution conditions include one or more of: a target data distribution, a minimum number of local data instances in each class of the group of classes, a maximum number of local data instances in each class of the group of classes, a ratio between a first number of data instances in one class, of the group of classes, associated with a greatest number of local data instances and a second number of data instances in one class, of the group of classes, associated with a least number of local data instances, a mean value associated with the group of local data instances, or a variance associated with the group of local data instances.

Clause 18. The method of any one of Clauses 16-17, wherein the second message configures the first UE to receive a third message indicating the target data distribution.

Clause 19. The method of Clause 18, further comprising transmitting the third message indicating the target distribution.

Clause 20. The method of Clause 18, further comprising transmitting a fourth message configuring a second UE to transmit the third message, indicating the target data distribution, to the first UE.

Clause 21. The method of Clause 20, wherein: the target data distribution includes indications of one or more target data instances; and each target data instance of the one or more target data instances is associated with a one class of the group of classes or an input of a group of inputs received at the second UE.

Clause 22. The method of Clause 16, wherein the update to the group of local data instances indicates an adjustment to an amount of local data instances in the group of local data instances.

Clause 23. The method of any one of Clauses 16-22, wherein the one or more distributions include one of: a first distribution associated with a set of input data instances associated with inputs to the machine learning model and a second distribution associated with set of output data instances associated with outputs from the machine learning model: or the second distribution associated with set of output data instances.

Clause 24. The method of any one of Clauses 16-23, further comprising: aggregating the first gradient with a group of second gradients to obtain a global update: and updating a federated learning model with the global update, wherein each gradient of the group of gradients is received from a respective second UE of a group of second UEs.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on," "responsive to," or "otherwise associated with" unless explicitly stated otherwise.

What is claimed is:

1. A method for wireless communication at a first user equipment (UE), comprising:
    transmitting, from the first UE to a network node, a first message indicating one or more distributions of a group of local data instances stored at the first UE, the group of local data instances associated with a machine learning model implemented at the first UE, each local data instance of the group of local data instances associated with a class of a group of classes;
    receiving, associated with transmitting the first message, from the network node, a second message indicating an update to the group of local data instances, in accordance with the one or more distributions of the group of local data instances failing to satisfy one or more data distribution conditions;
    updating, at the first UE in accordance with receiving the second message, the group of local data instances in accordance with receiving the first message;
    training, at the first UE, the machine learning model with the group of updated local data instances; and
    transmitting, from the first UE to the network node, a third message, indicating one or more parameters associated with the machine learning model in accordance with training the machine learning model with the group of updated local data instances.

2. The method of claim 1, wherein the one or more data distribution conditions include one or more of a target data distribution, a minimum number of local data instances in each class of the group of classes, a maximum number of local data instances in each class of the group of classes, a ratio between a first number of data instances in one class, of the group of classes, associated with a greatest number of local data instances and a second number of data instances in one class, of the group of classes, associated with a least number of local data instances, a mean value associated with the group of local data instances, or a variance associated with the group of local data instances.

3. The method of claim 1, wherein updating the group of local data instances comprises:
augmenting the group of local data instances to include one or more new local data instances such that each distribution of the one or more distributions satisfies the one or more data distribution conditions; and/or
removing one or more local data instances from the group of local data instances such that each distribution of the one or more distributions satisfies the one or more data distribution conditions.

4. The method of claim 1, further comprising receiving a fourth message indicating the target data distribution, wherein:
the second message configures the first UE to receive the fourth message.

5. The method of claim 4, wherein:
the target data distribution includes indications of one or more target data instances; and
each target data instance of the one or more target data instances is associated with a one class of the group of classes or an input of a group of inputs received at a second UE.

6. The method of claim 5, wherein the third message is received via a physical sidelink shared channel (PSSCH) or a physical sidelink control channel (PSCCH).

7. The method of claim 1, wherein the update to the group of local data instances indicates an adjustment to an amount of local data instances in the group of local data instances.

8. The method of claim 1, wherein the one or more distributions include one of:
a first distribution associated with a set of output data instances associated with outputs from the machine learning model and a second distribution associated with a set of input data instances associated with inputs to the machine learning model; or
the first distribution associated with set of output data instances.

9. The method of claim 1, further comprising:
estimating a gradient associated with minimizing a loss function, associated with the machine learning model, based on training the machine learning model,
wherein the gradient is a parameter of the one or more parameters.

10. A first user equipment (UE) for wireless communications, comprising:
at least one processor; and
at least one memory coupled with the at least one processor and storing instructions operable, when executed by the processor, to cause the apparatus to:
transmit, to a network node, a first message indicating one or more distributions of a group of local data instances stored at the first UE, the group of local data instances associated with a machine learning model implemented at the first UE, each local data instance of the group of local data instances associated with a class of a group of classes;
receive, associated with transmitting the first message, from the network node, a second message indicating an update to the group of local data instances, in accordance with the one or more distributions of the group of local data instances failing to satisfy one or more data distribution conditions;
update, in accordance with receiving the second message, the group of local data instances in accordance with receiving the first message;
train the machine learning model with the group of updated local data instances; and
transmit, to the network node, a third message, indicating one or more parameters associated with the machine learning model in accordance with training the machine learning model with the group of updated local data instances.

11. The apparatus of claim 10, wherein the one or more data distribution conditions include one or more of a target data distribution, a minimum number of local data instances in each class of the group of classes, a maximum number of local data instances in each class of the group of classes, a ratio between a first number of data instances in one class, of the group of classes, associated with a greatest number of local data instances and a second number of data instances in one class, of the group of classes, associated with a least number of local data instances, a mean value associated with the group of local data instances, or a variance associated with the group of local data instances.

12. The apparatus of claim 10, wherein execution of the instructions to update the group of local data instances further cause the apparatus to:
augment the group of local data instances to include one or more new local data instances such that each distribution of the one or more distributions satisfies the one or more data distribution conditions; and/or
remove one or more local data instances from the group of local data instances such that each distribution of the one or more distributions satisfies the one or more data distribution conditions.

13. The apparatus of claim 10, wherein execution of the instructions further cause the apparatus to receive a fourth message indicating a target data distribution, wherein:
the second message configures the first UE to receive the fourth message.

14. The apparatus of claim 10, wherein the update to the group of local data instances indicates an adjustment to an amount of local data instances in the group of local data instances.

15. The apparatus of claim 10, wherein the one or more distributions include one of:
a first distribution associated with a set of output data instances associated with outputs from the machine learning model and a second distribution associated with a set of input data instances associated with inputs to the machine learning model; or
the first distribution associated with set of output data instances.

* * * * *